US012671848B2

(12) United States Patent
Huang et al.

(10) Patent No.: US 12,671,848 B2
(45) Date of Patent: Jun. 30, 2026

(54) PIXEL VALUE MAPPING METHOD

(71) Applicant: Alibaba (China) Co., Ltd., Hangzhou (CN)

(72) Inventors: Zhiwei Huang, Hangzhou (CN); Jianhua Chen, Hangzhou (CN); Yan Ye, San Diego, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 0 days.

(21) Appl. No.: 18/602,449

(22) Filed: Mar. 12, 2024

(65) Prior Publication Data

US 2024/0323452 A1      Sep. 26, 2024

(30) Foreign Application Priority Data

Mar. 20, 2023    (CN) .......................... 202310281739.3

(51) Int. Cl.
*H04N 19/85*          (2014.01)
*H04N 19/182*         (2014.01)

(52) U.S. Cl.
CPC ........... *H04N 19/85* (2014.11); *H04N 19/182* (2014.11)

(58) Field of Classification Search
CPC .... H04N 19/85; H04N 19/182; H04N 19/186; Y02D 10/00; G06F 16/2282; G06F 16/24532
See application file for complete search history.

(56) References Cited

U.S. PATENT DOCUMENTS

| 2020/0329257 A1* | 10/2020 | Zhao | H04N 19/615 |
| 2024/0212229 A1* | 6/2024 | Zhang | G06T 11/001 |

FOREIGN PATENT DOCUMENTS

| CN | 112598758 A | 4/2021 |
| CN | 113489930 A | 10/2021 |
| CN | 114827385 A | 7/2022 |
| CN | 115034970 A | 9/2022 |
| CN | 115239578 A | 10/2022 |
| CN | 115462076 A | 12/2022 |

OTHER PUBLICATIONS

Office Action issued in corresponding Chinese Application No. 202310281739.3 on Jun. 17, 2025, (9 pages).

* cited by examiner

*Primary Examiner* — Francis Geroleo
(74) *Attorney, Agent, or Firm* — Finnegan, Henderson, Farabow, Garrett & Dunner, LLP

(57) ABSTRACT

Embodiments of the present disclosure provide a pixel value mapping method, including: determining a to-be-processed image and a mapping table corresponding to the to-be-processed image; performing a table lookup on pixel values of multiple pixels in the to-be-processed image according to the mapping table in parallel to obtain mapped values each corresponding to a pixel of the multiple pixels; and determining a mapped image corresponding to the to-be-processed image according to the mapped values obtained based on the table lookup.

18 Claims, 16 Drawing Sheets

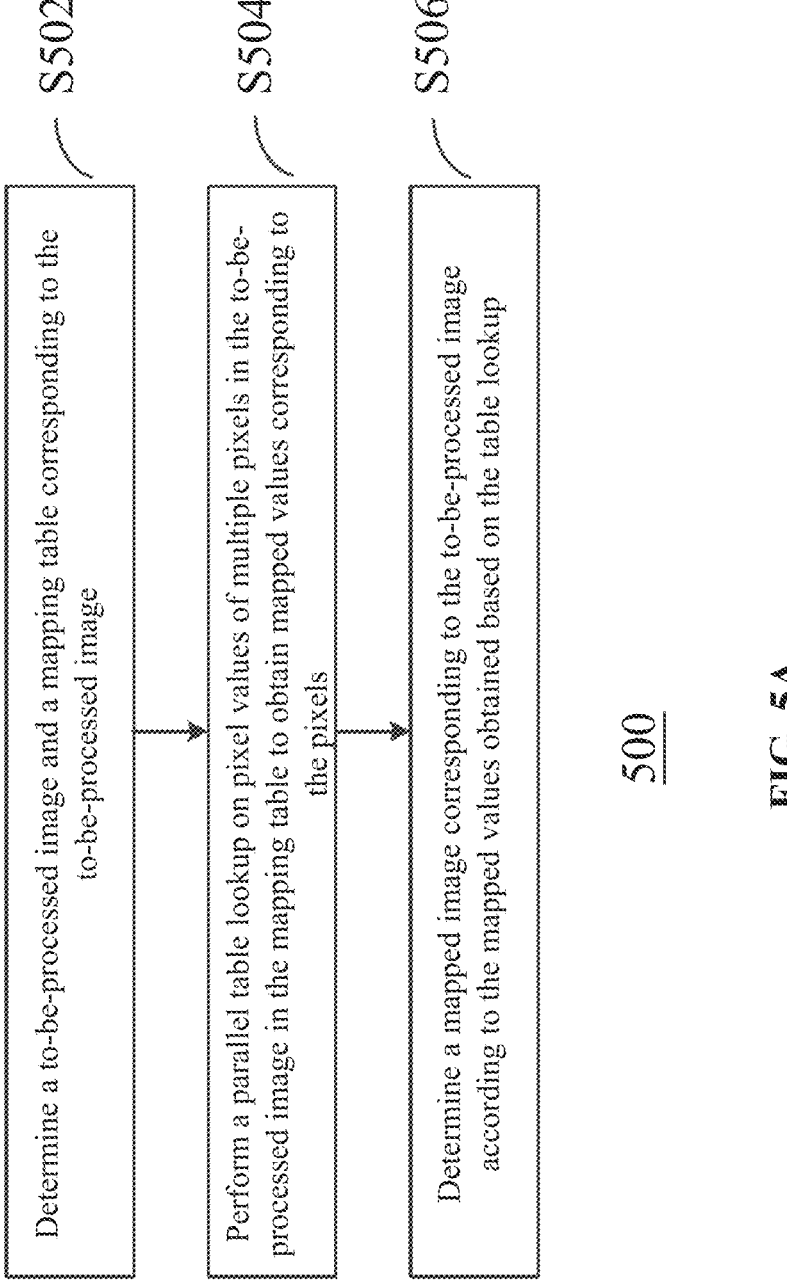

Determine a to-be-processed image and a mapping table corresponding to the to-be-processed image

S502

Perform a parallel table lookup on pixel values of multiple pixels in the to-be-processed image in the mapping table to obtain mapped values corresponding to the pixels

S504

Determine a mapped image corresponding to the to-be-processed image according to the mapped values obtained based on the table lookup

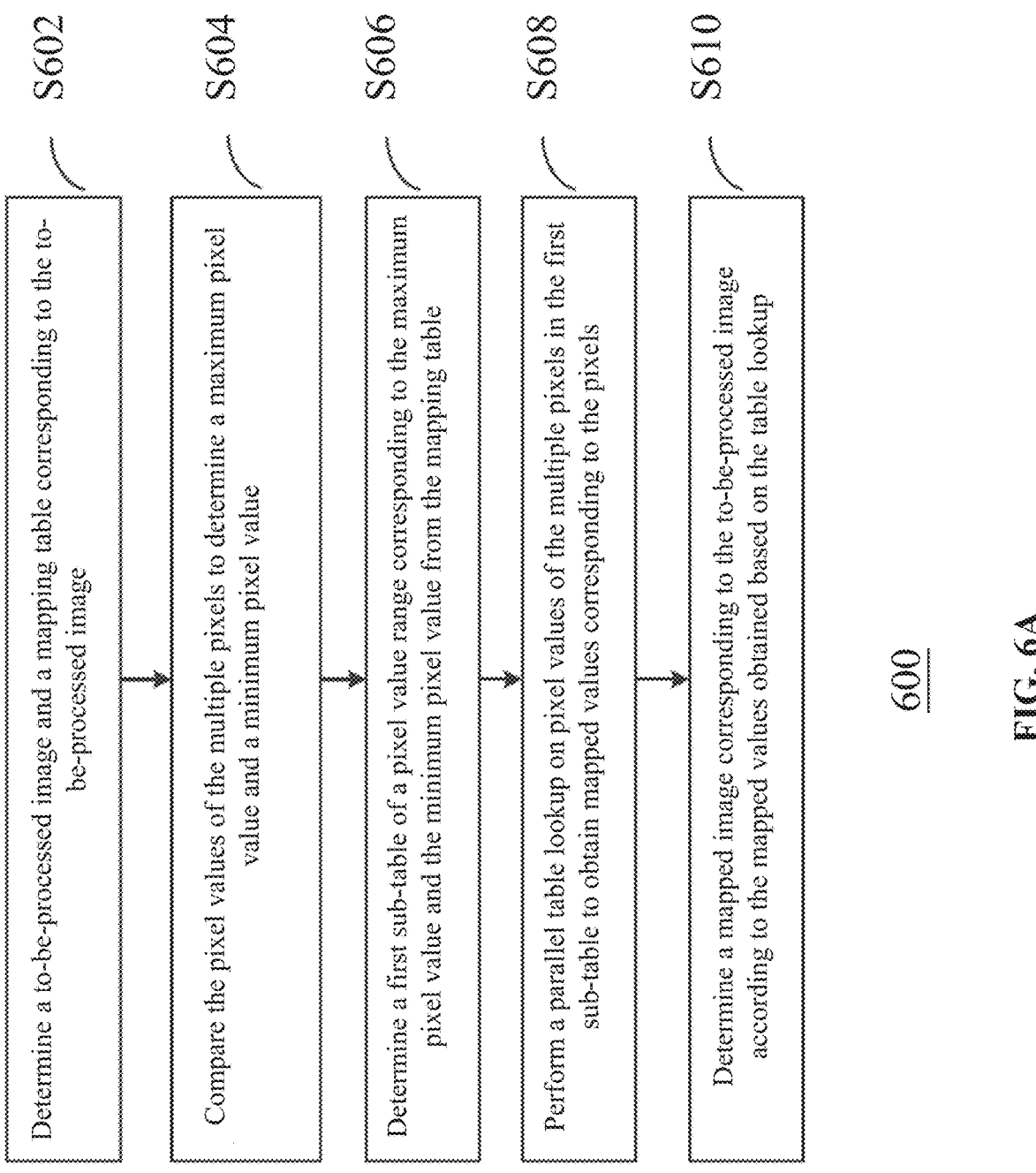

S602

Determine a to-be-processed image and a mapping table corresponding to the to-be-processed image

S604

Compare the pixel values of the multiple pixels to determine a maximum pixel value and a minimum pixel value

S606

Determine a first sub-table of a pixel value range corresponding to the maximum pixel value and the minimum pixel value from the mapping table

S608

Perform a parallel table lookup on pixel values of the multiple pixels in the first sub-table to obtain mapped values corresponding to the pixels

S610

Determine a mapped image corresponding to the to-be-processed image according to the mapped values obtained based on the table lookup

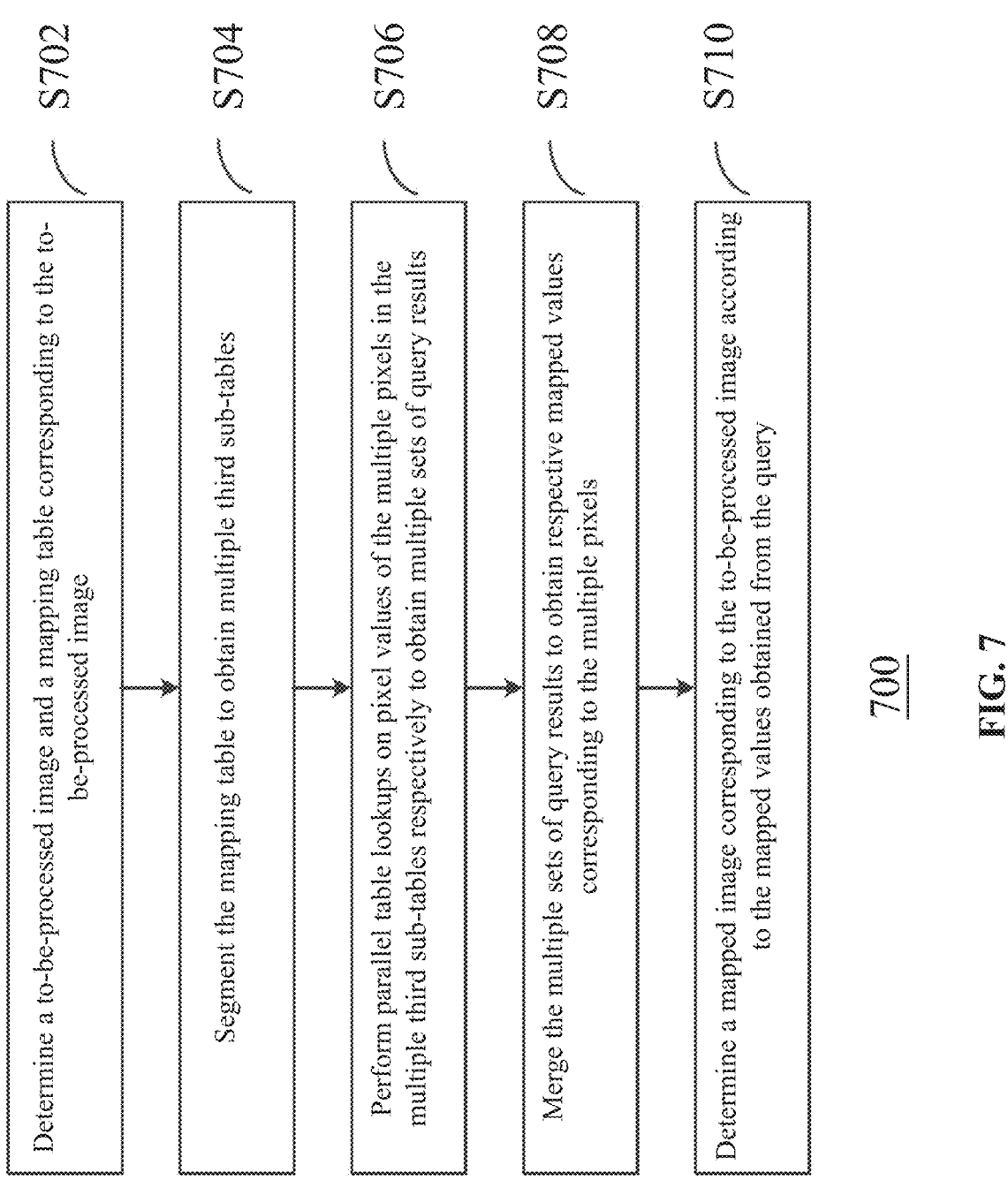

S702

Determine a to-be-processed image and a mapping table corresponding to the to-be-processed image

S704

Segment the mapping table to obtain multiple third sub-tables

S706

Perform parallel table lookups on pixel values of the multiple pixels in the multiple third sub-tables respectively to obtain multiple sets of query results

S708

Merge the multiple sets of query results to obtain respective mapped values corresponding to the multiple pixels

S710

Determine a mapped image corresponding to the to-be-processed image according to the mapped values obtained from the query

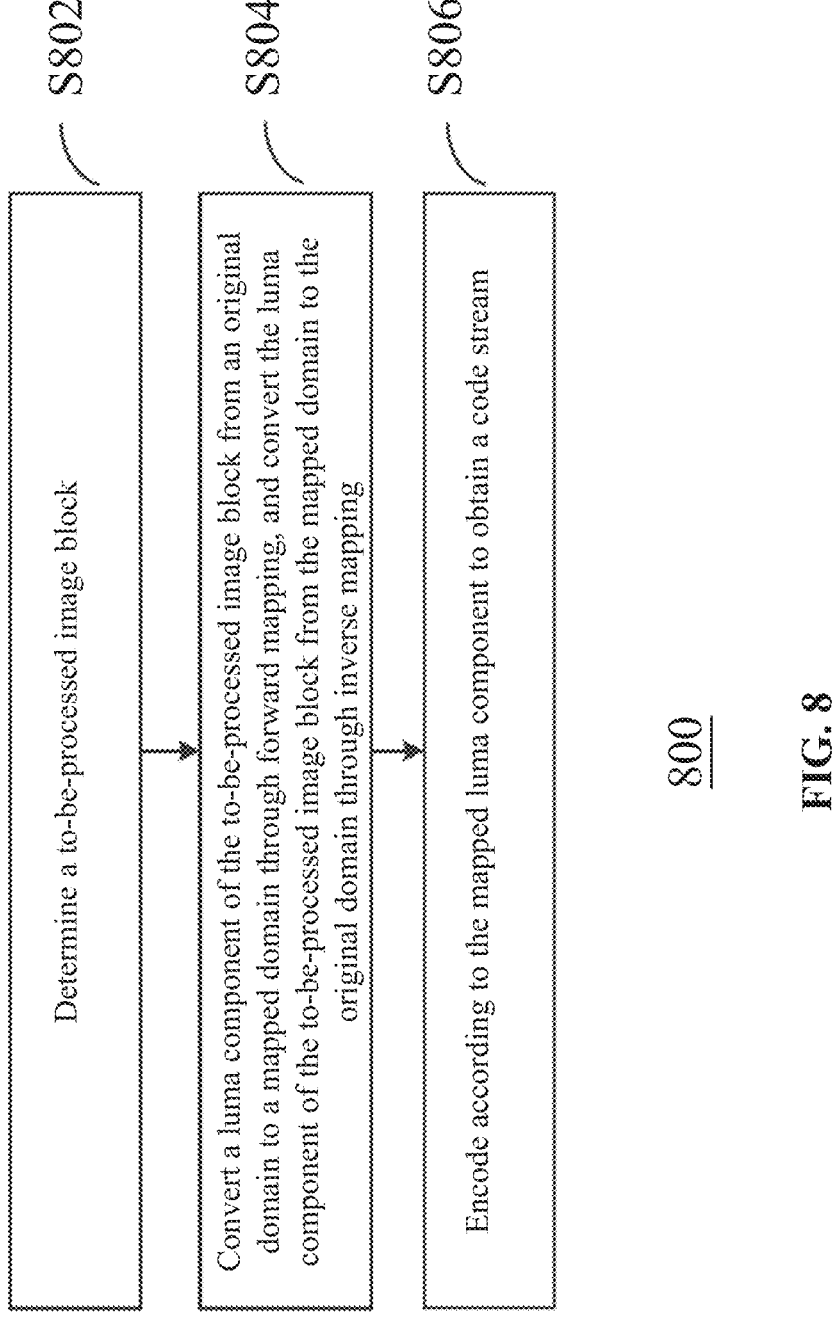

S802

Determine a to-be-processed image block

S804

Convert a luma component of the to-be-processed image block from an original domain to a mapped domain through forward mapping, and convert the luma component of the to-be-processed image block from the mapped domain to the original domain through inverse mapping

S806

Encode according to the mapped luma component to obtain a code stream

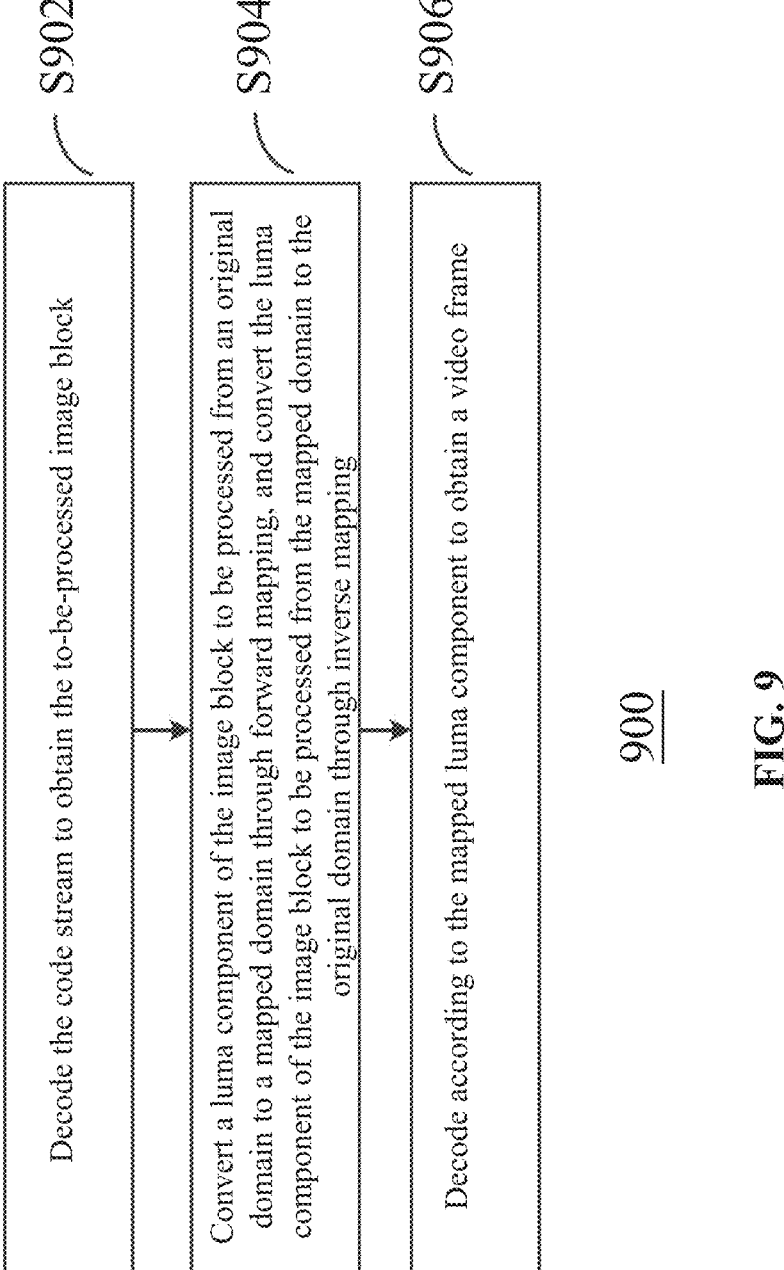

S902

Decode the code stream to obtain the to-be-processed image block

S904

Convert a luma component of the image block to be processed from an original domain to a mapped domain through forward mapping, and convert the luma component of the image block to be processed from the mapped domain to the original domain through inverse mapping

S906

Decode according to the mapped luma component to obtain a video frame

PIXEL VALUE MAPPING METHOD

CROSS-REFERENCE TO RELATED APPLICATIONS

The disclosure claims the benefits of priority to Chinese Application No. 202310281739.3, filed on Mar. 20, 2023, which is incorporated herein by reference in its entirety.

TECHNICAL FIELD

Embodiments of the present disclosure relate to the field of image processing, and in particular to a pixel value mapping method, an encoding method, a decoding method, an electronic device, and a storage medium.

BACKGROUND OF THE DISCLOSURE

In the field of video coding technology, in order to improve the encoding and decoding efficiency, an adaptive loop shaper (Luma Mapping with Chroma Scaling, LMCS) has been incorporated, which mainly includes Luma Mapping (LM) based on the adaptive piecewise linear model and luma-based Chroma Scaling (CS).

The basic idea of Luma Mapping based on the adaptive piecewise linear model is to better utilize the allowed luma value range at the specified bit depth. During Luma Mapping, a forward mapping table FwdLUT and an inverse mapping table InvLUT are first generated based on a forward mapping function FwdMap and an inverse mapping function InvMap, and forward mapping and inverse mapping are completed by querying the forward mapping table and the inverse mapping table.

However, during the mapping process, table lookups need to be performed pixel by pixel, which is cumbersome and inefficient.

SUMMARY

In view of this, the disclosed embodiments of the present disclosure provide a pixel value mapping method to at least partially solve the above problems.

According to some embodiments of the present disclosure, a pixel value mapping method is provided, including: determining a to-be-processed image and a mapping table corresponding to the to-be-processed image; performing a table lookup on pixel values of multiple pixels in the to-be-processed image according to the mapping table in parallel to obtain mapped values each corresponding to a pixel of the multiple pixels; and determining a mapped image corresponding to the to-be-processed image according to the mapped values obtained based on the table lookup.

In some embodiments of the present disclosure, the method further includes: comparing the pixel values of the multiple pixels to determine a maximum pixel value and a minimum pixel value; and wherein performing the table lookup on the pixel values of the multiple pixels in the to-be-processed image according to the mapping table in parallel to obtain the mapped values each corresponding to a pixel of the multiple pixels includes: determining a first sub-table of a pixel value range corresponding to the maximum pixel value and the minimum pixel value from the mapping table; and performing the table lookup on the pixel values of the multiple pixels according to the first sub-table in parallel to obtain the mapped values each corresponding to a pixel of the multiple pixels.

In some embodiments of the present disclosure, the number of the multiple pixels is m times of a degree of parallelism of the parallel table lookup, m being a positive integer, and performing the table lookup on the pixel values of the multiple pixels according to the first sub-table in parallel to obtain the mapped values each corresponding to a pixel of the multiple pixels includes: dividing the pixel values of the multiple pixels into m groups of to-be-queried pixel values according to the degree of parallelism; and performing a NEON-based parallel table lookup on the to-be-queried pixel values according to the first sub-table by groups to obtain the mapped values each corresponding to a pixel of the multiple pixels.

In some embodiments of the present disclosure, performing the NEON-based parallel table lookup on the to-be-queried pixel values according to the first sub-table by groups to obtain the mapped values each corresponding to a pixel of the multiple pixels includes: segmenting the first sub-table to obtain multiple second sub-tables; performing the NEON-based parallel table lookup on the to-be-queried pixel values according to the multiple second sub-tables by groups to obtain multiple sets of query results corresponding to respective groups of the to-be-queried pixel values; and merging the multiple sets of query results to obtain respective mapped values corresponding to respective groups of the to-be-queried pixel values.

In some embodiments of the present disclosure, comparing the pixel values of the multiple pixels to determine the maximum pixel value and the minimum pixel value includes: initializing a maximum value register and a minimum value register, where the number of pixel values stored in the maximum value register or the minimum value register is i, and the number of the multiple pixels is n times the number of the pixel values i, n being a positive integer; dividing the pixel values of the multiple pixels into n groups of to-be-compared pixel values, where each group of the to-be-compared pixel values includes i pixel values; comparing each group of the to-be-compared pixel values with the pixel values stored in the maximum value register bit by bit, and updating the i pixel values stored in the maximum value register according to the maximum value in the comparison result; comparing each group of the to-be-compared pixel values with the pixel values stored in the minimum value register bit by bit, and updating the i pixel values stored in the minimum value register according to the minimum value in the comparison result; and determining the maximum pixel value from the i pixel values stored in the maximum value register, and determining the minimum pixel value from the i pixel values stored in the minimum value register.

In some embodiments of the present disclosure, determining the first sub-table of the pixel value range corresponding to the maximum pixel value and the minimum pixel value from the mapping table includes: determining the number of pixel values of the first sub-table according to the difference between the maximum pixel value and the minimum pixel value; and determining the first sub-table from the mapping table according to the number of pixel values starting from the minimum pixel value.

In some embodiments of the present disclosure, performing the table lookup on the pixel values of the multiple pixels in the to-be-processed image according to the mapping table in parallel to obtain the mapped values each corresponding to a pixel of the multiple pixels includes: segmenting the mapping table to obtain multiple third sub-tables; performing parallel table lookups on the pixel values of the multiple pixels in the multiple third sub-tables respectively to obtain multiple sets of query results; and merging the multiple sets of query results to obtain respective mapped values each corresponding to a pixel of the multiple pixels.

According to some embodiments of the present disclosure, an encoding method is provided, including: determining a to-be-processed image block; converting the luma component of the to-be-processed image block from an original domain to a mapped domain through forward mapping; and converting the luma component of the to-be-processed image block from the mapped domain to the original domain through inverse mapping, where at least one of the forward mapping and the inverse mapping is implemented through the method described above; and encoding according to the mapped luma component to obtain a code stream.

According to some embodiments of the present disclosure, a decoding method is provided, including: decoding a code stream to obtain a to-be-processed image block; converting the luma component of the to-be-processed image block from an original domain to a mapped domain through forward mapping; and converting the luma component of the to-be-processed image block from the mapped domain to the original domain through inverse mapping, where at least one of the forward mapping and the inverse mapping is implemented through any of the methods described above; and decoding according to the mapped luma component to obtain a video frame.

According to some embodiments of the present disclosure, an electronic device is provided, including: one or more processors, a memory, a communication interface, and a communication bus. The one or more processors, the memory, and the communication interface communicate with each other via the communication bus. The memory is configured to store instructions that are executable by the one or more processors to cause the electronic device to perform operations corresponding to any of the above-described methods.

According to some embodiments of the present disclosure, a computer-readable storage medium is provided, storing instructions that are executable by one or more processors of a device to cause the device to perform any of the above-described methods.

BRIEF DESCRIPTION OF THE DRAWINGS

The accompanying drawings described herein are used for providing a further understanding of the present disclosure, and forming a part of the present disclosure. Exemplary examples of the present disclosure and descriptions thereof are used for explaining the present disclosure, but do not constitute any inappropriate limitation to the present disclosure. In the accompanying drawings:

FIG. 5A is a flow chart illustrating steps of an exemplary pixel value mapping method, according to some embodiments of the present disclosure.

FIG. 6A is a flow chart illustrating steps of an exemplary pixel value mapping method according to some embodiments of the present disclosure.

FIG. 7 is a flow chart illustrating steps of an exemplary pixel value mapping method according to some embodiments of the present disclosure.

FIG. 8 is a flow chart illustrating steps of an exemplary encoding method according to some embodiments of the present disclosure.

FIG. 9 is a flow chart illustrating steps of an exemplary decoding method according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

The disclosed embodiments of the present disclosure provide a method for determining the group of pictures size based on the motion complexity of picture content in picture sets of varying sizes. By adaptively selecting the group of pictures size that matches the motion complexity of the to-be-encoded picture frame from a range of candidate sizes, the subsequent encoding process can enhance the rate distortion performance of the resulting output.

The Joint Video Experts Team (JVET) of the ITU-T Video Coding Expert Group (ITU-T VCEG) and the ISO/IEC Moving Picture Expert Group (ISO/IEC MPEG) has been developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

The VVC standard has been progressing well since April 2018, and continues to include more coding technologies that provide better compression performance. VVC is based on the same hybrid video coding system that has been used in modern video compression standards such as HEVC, H.264/AVC, MPEG2, H.263, etc.

Figure 1:
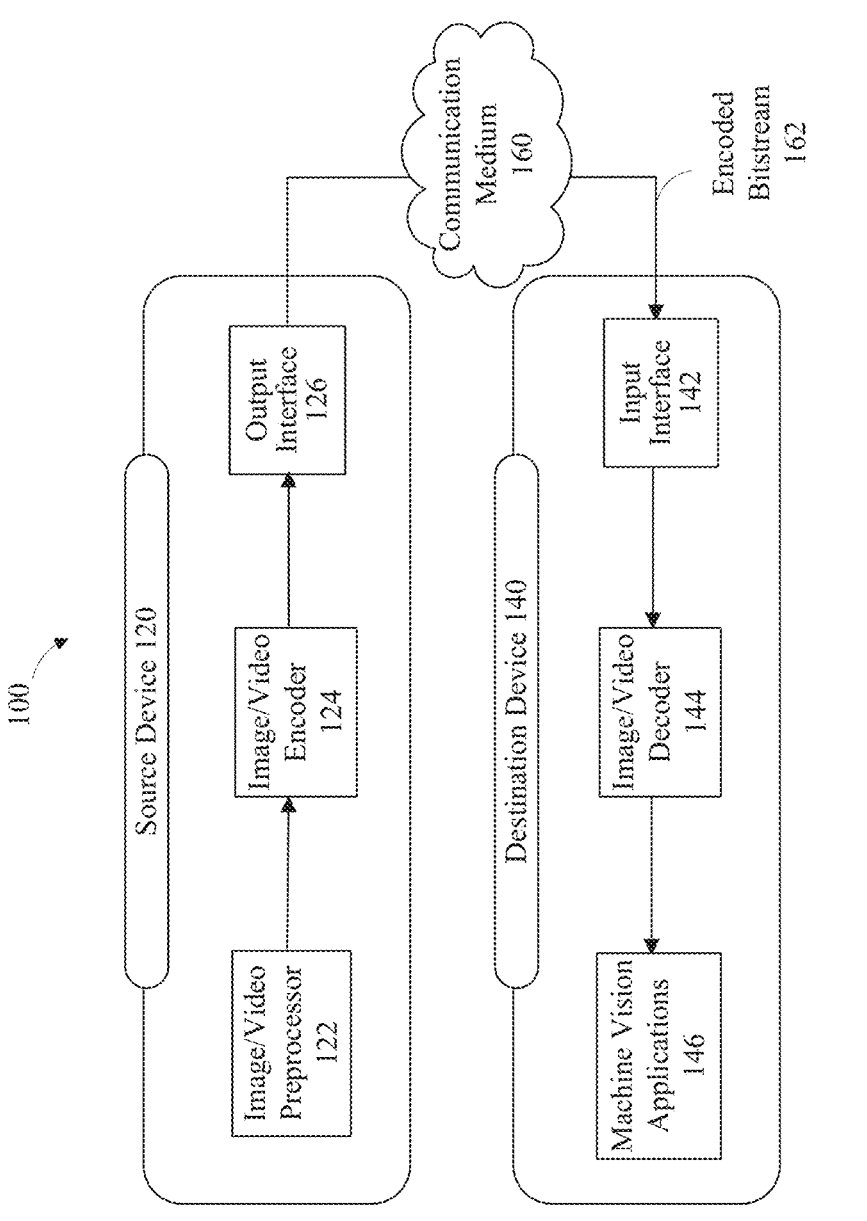
FIG. 1 is a schematic diagram illustrating an exemplary system for preprocessing and coding image data, according to some embodiments of the present disclosure.

FIG. 1 is a block diagram illustrating a system 100 for preprocessing and coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and one or more machine vision applications 146. Image/video preprocessor 122 preprocesses image data, i.e., image(s) or video(s), and generates an input bitstream for image/video encoder 124. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data, which can be utilized by machine vision applications 146.

More specifically, source device 120 may further include various devices (not shown) for providing source image data to be preprocessed by image/video preprocessor 122. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Machine vision applications 146 include various hardware or software for utilizing the decoded image data generated by image/video decoder 144. For example, machine vision applications 146 may include a display device that displays the decoded image data to a user and may include any of a variety of display devices such as a cathode ray tube (CRT), a liquid crystal display (LCD), a plasma display, an organic light emitting diode (OLED) display, or another type of display device. As another example, machine vision applications 146 may include one or more processors configured to use the decoded image data to perform various machine-vision applications, such as object recognition and tracking, face recognition, images matching, image/video search, augmented reality, robot vision and navigation, autonomous driving, 3-dimension structure construction, stereo correspondence, motion tracking, etc.

Next, exemplary image data encoding and decoding techniques are described in connection with FIGS. 2A-2B and FIGS. 3A-3B.

Figure 2A:
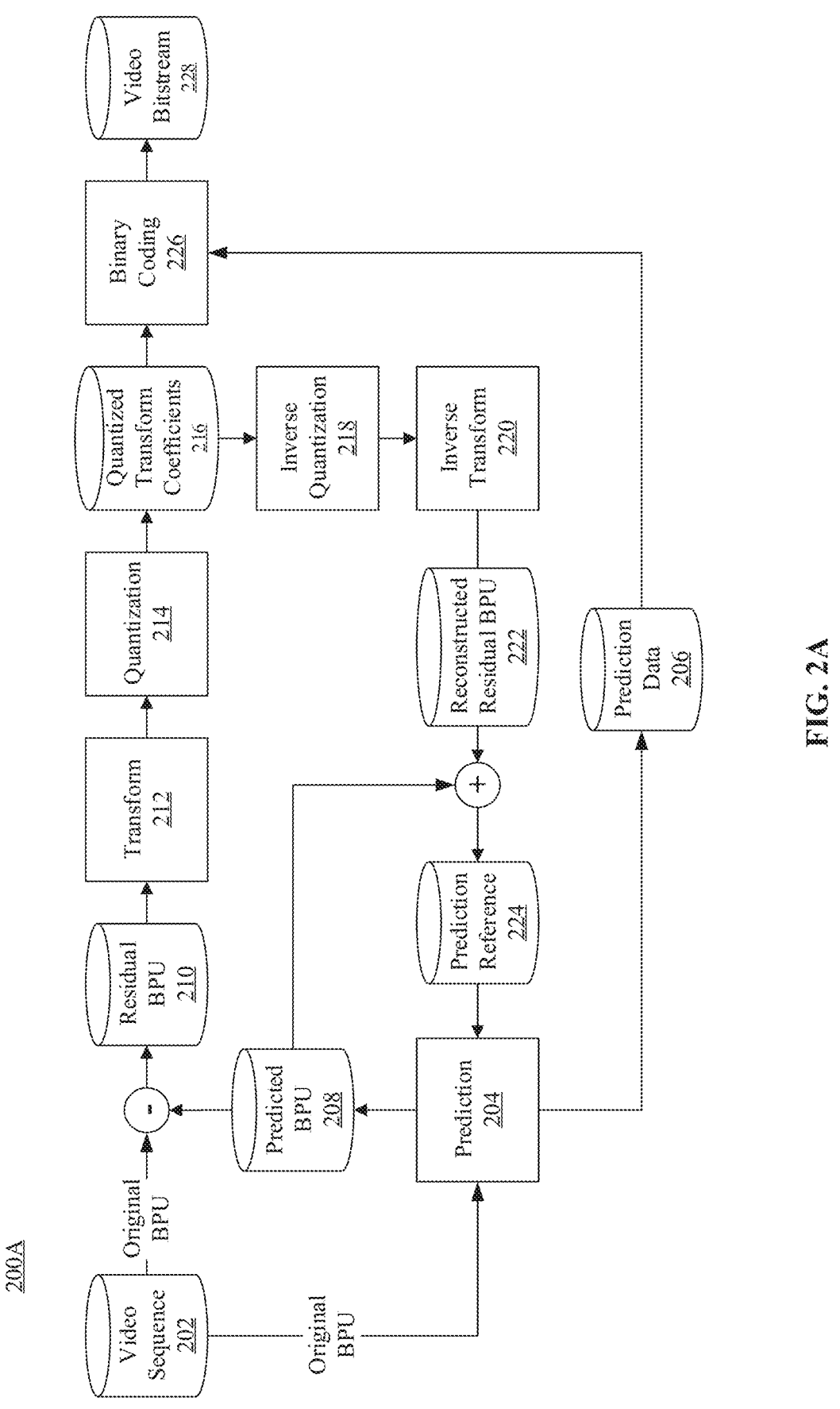
FIG. 2A is a schematic diagram illustrating an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
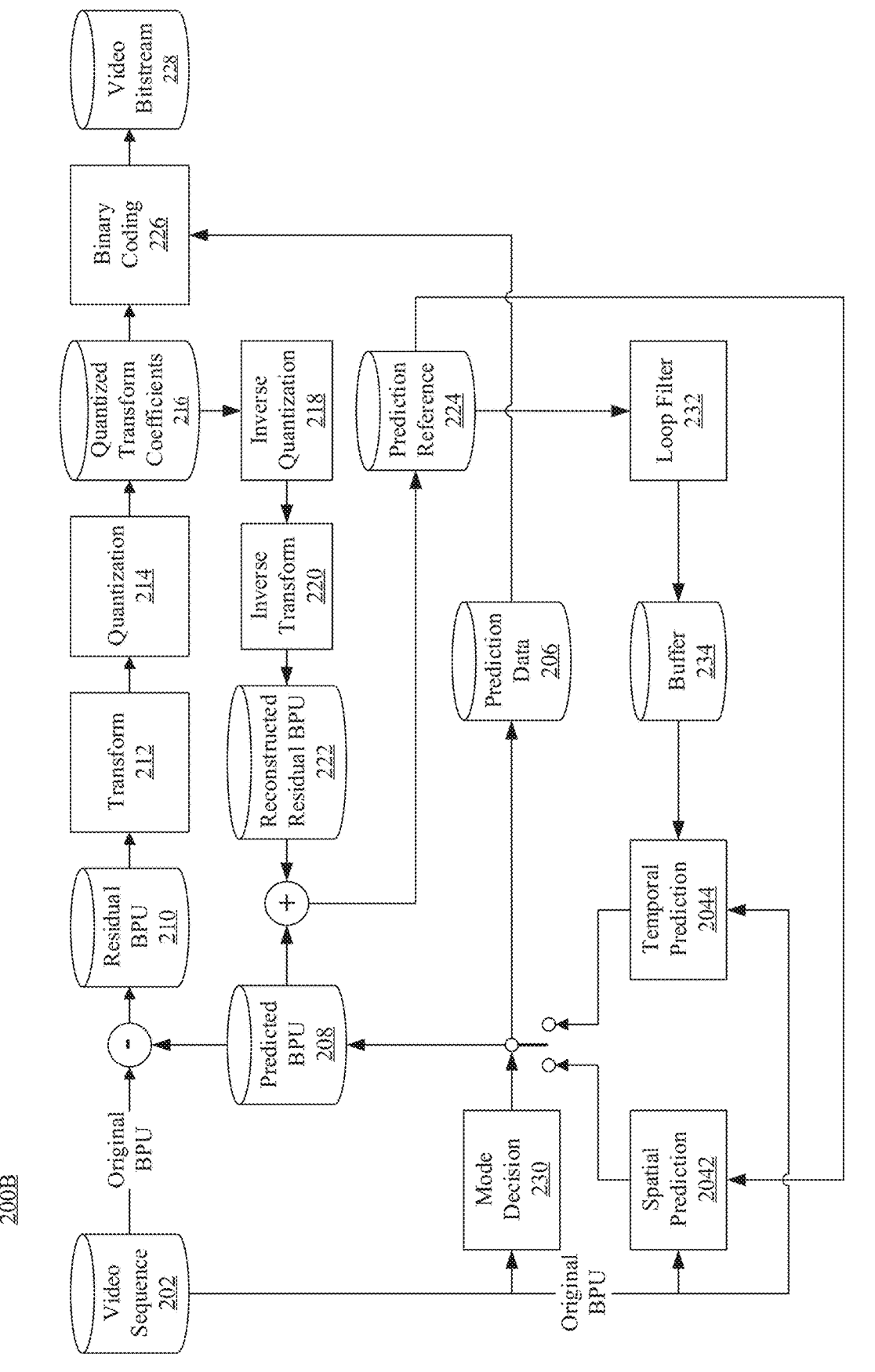
FIG. 2B is a schematic diagram illustrating another exemplary encoding process of a hybrid video coding system, consistent with embodiments of the disclosure.

FIG. 2B illustrates a schematic diagram of another example encoding process 200B, consistent with embodiments of the disclosure. For example, the encoding process 200B can be performed by an encoder, such as image/video encoder 124 in FIG. 1. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
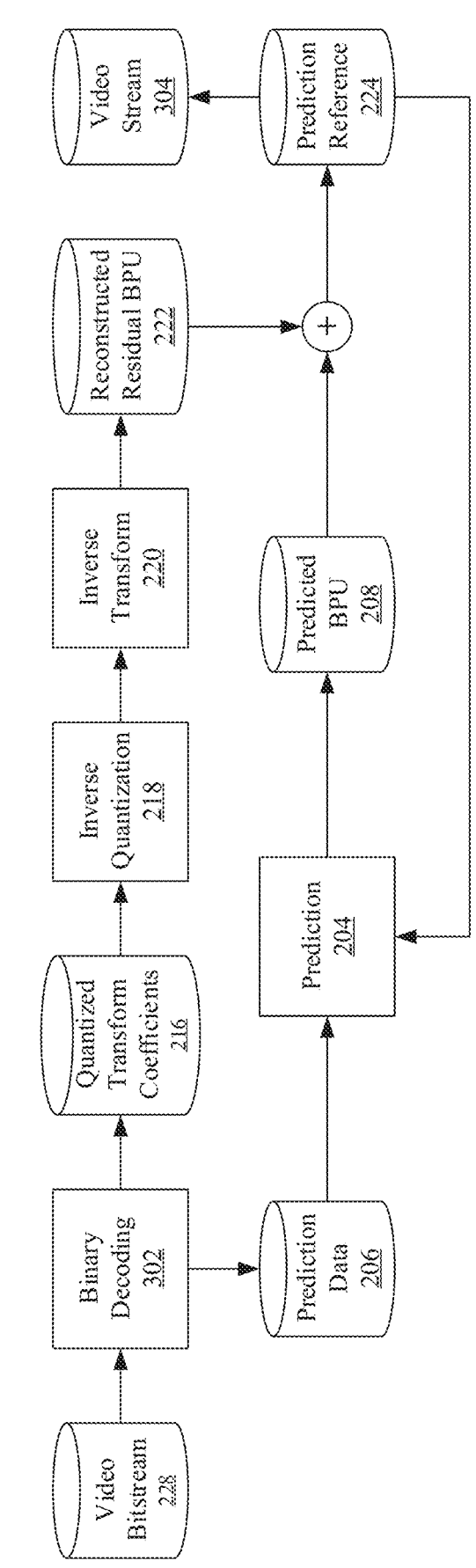
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. For example, the decoding process 300A can be performed by a decoder, such as image/video decoder 144 in FIG. 1. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
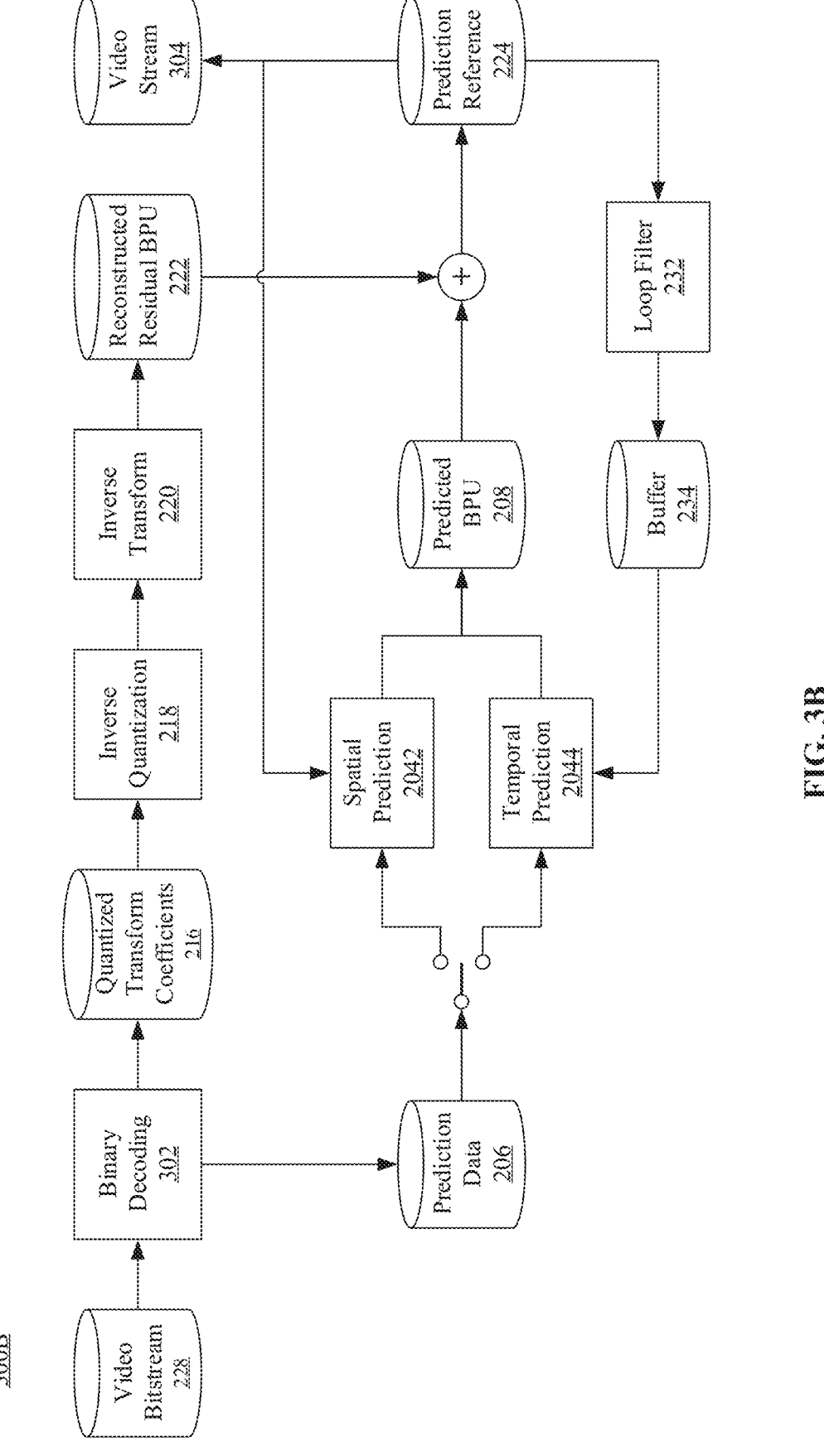
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. For example, the decoding process 300B can be performed by a decoder, such as image/video decoder 144 in FIG. 1. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
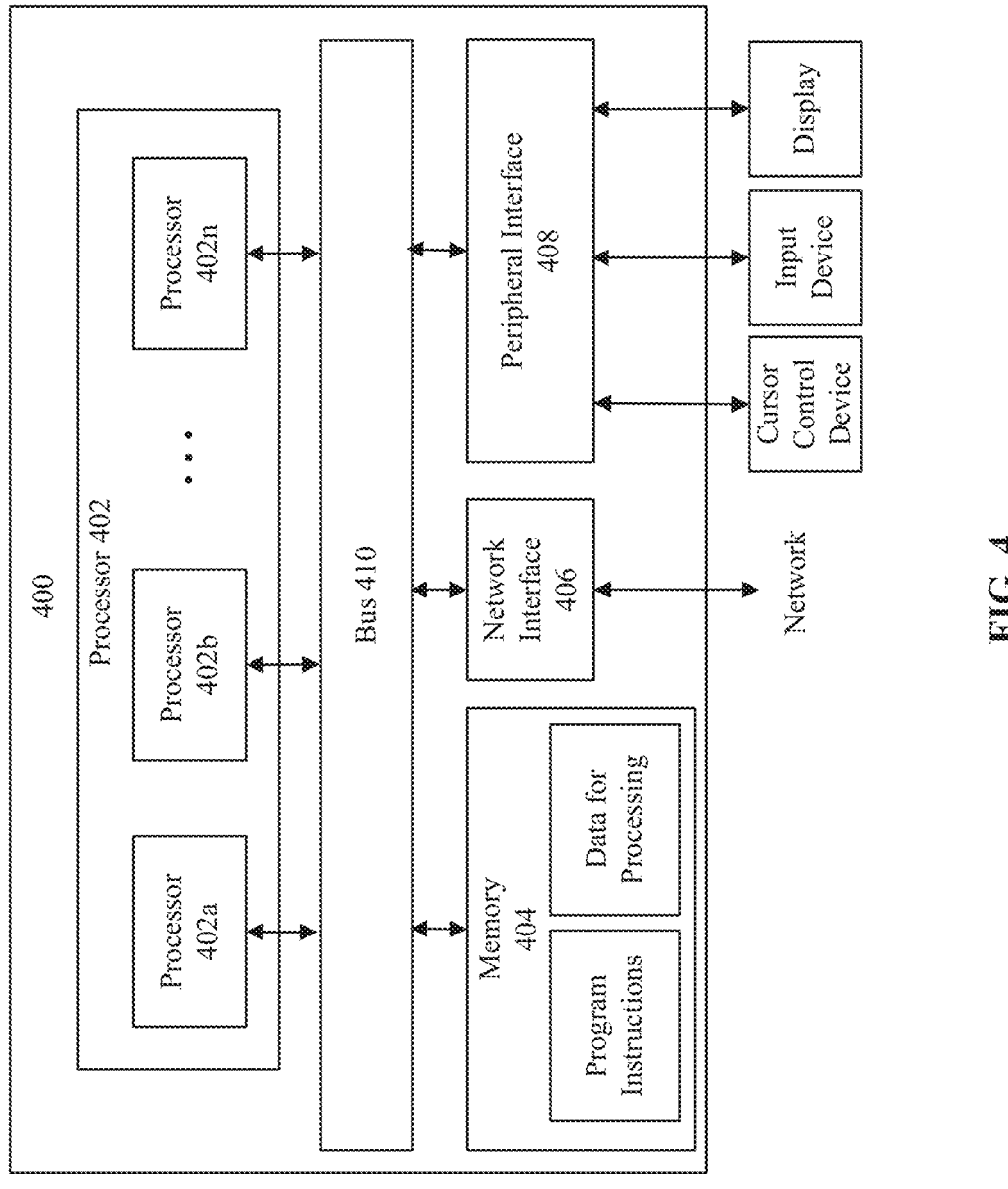
FIG. 4 is a block diagram of an exemplary apparatus for preprocessing or coding image data, according to some embodiments of the present disclosure.

Referring back to FIG. 1, each of image/video preprocessor 122, image/video encoder 124, and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be a preprocessor, an encoder, or a decoder. As shown in FIG. 4, apparatus 400 can include processor 402. When processor 402 executes instructions described herein, apparatus 400 can become a specialized machine for preprocessing, encoding, or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

According to some embodiments of the present disclosure, a method is provided that involves identifying an image for processing along with a corresponding mapping table. A parallel table lookup is then executed on the pixel values of multiple pixels within the image, using the mapping table, resulting in mapped values that correspond to each pixel. Based on the results of the lookup operation (also referred to as a "query"), a mapped image is determined that corresponds to the original image. The use of parallel table lookup enables multiple pixel values to be queried in the mapping table at once, reducing the complexity of the process and improving its efficiency.

As stated above, during Luma Mapping, a forward mapping table FwdLUT and an inverse mapping table InvLUT are first generated based on the forward mapping function FwdMap and the inverse mapping function InvMap, and forward mapping and inverse mapping are completed by querying the forward mapping table and the inverse mapping table. The size of the forward mapping table and inverse mapping table and the code value range can be determined by the pixel bit depth bitdepth, and the table size is 1<<bitdepth, where "<<" indicates left shift 1 by a number of bits corresponding to the bit depth. For example, if the bit depth is 8 bits, then 1 is shifted to the left by 8 bits. The 8-bit binary corresponds to 256, then the size of the forward mapping table and the inverse mapping table is 256, and the code value range is [0, 255].

Luma Mapping can be achieved through the following process. According to the bit depth bitdepth, the forward mapping table FwdLUT and the inverse mapping table InvLUT with the size of (1<<bitdepth) can be established by using the piecewise linear model. Table lookups pixel by pixel are performed by the algorithm coded in C language to complete forward mapping and inverse mapping.

An example formula of forward mapping can be based on:

$$P_{pwd} = FwdLUT[P_{org}] \text{ where } P_{org} \in [0, 1 \ll bitdepth - 1] \quad (1)$$

An example formula of inverse mapping can be based on:

$$P_{org} = InvLut[P_{pwd}] \text{ where } P_{pwd} \in [0, 1 \ll bitdepth - 1] \quad (2)$$

where $P_{org}$ is the pixel value in the original domain, $P_{pwd}$ is the pixel value in the mapped domain, and bitdepth is the bit depth of the pixel. Forward mapping is used to convert the original domain into the mapped domain. Operations such as intra-frame prediction and inverse transformation can be performed in the mapped domain. Inverse mapping is used to convert the mapped domain into the original domain. Operations such as loop filtering and motion compensation can be performed in the original domain and the final reconstructed image can be obtained in the original domain.

In the conventional solution, the pixel-by-pixel function mapping calculation can be converted into table look-ups by pre-establishing the forward mapping table FwdLUT and the inverse mapping table InvLUT. The forward mapping and the inverse mapping can be completed through the pixel-by-pixel table look-up, improving the efficiency of pixel value remapping. The pixel-by-pixel table lookup is still complicated, which may be subject to the relatively weak performance of the processor.

FIG. 5A is a flow chart illustrating steps of an exemplary pixel value mapping method 500, according to some embodiments of the present disclosure. Specifically, pixel value mapping method 500 may include the following steps S502 to S506, which can be implemented by an encoder or a decoder as described above, e.g., image/video encoder 124, image/video decoder 144 in FIG. 1, or apparatus 400 in FIG. 4. Here, an encoder is configured to implement the following steps S502 to S506 as an example.

In step S502, the encoder determines a to-be-processed image and a mapping table corresponding to the to-be-processed image.

In some embodiments, the to-be-processed image may be any image. For example, it may be a captured image, or an image processed from the actually captured image, such as the luma component or color component of the image. The to-be-processed image may be a complete image, or an area in a complete image, such as image blocks divided during video encoding and decoding. These are all within the protection scope of the present disclosure.

The mapping table corresponding to the to-be-processed image is a mapping table determined according to preset mapping. The mapping table is used to store pixel values before and after mapping. The mapping table may be the above described forward mapping table FwdLUT or inverse mapping table InvLUT. It may also be a mapping table of colors or the like. These are all within the protection scope of the present disclosure.

For example, if the to-be-processed image undergoes Luma Mapping, the luma value before mapping and the luma value after mapping may be stored in the mapping table. Taking the bit depth of 8 bits as an example, the pixel range corresponding to the luma before mapping is 0-255, and the pixel range corresponding to the luma after mapping can be also 0-255. Then the mapping table determined according to the preset mapping includes indexes of 0-255 and index values corresponding to the indexes. The index corresponds to the pixel value before mapping and the index value corresponds to the pixel value after mapping. The specific mapping may be linear mapping or nonlinear mapping, which is not limited herein. For example, the nonlinear mapping may map the pixel values of 0-100 to 0-59, map the pixel values of 101-200 to 60-200, and keep the pixel values greater than 200 unchanged.

In step S504, the encoder performs a parallel table lookup on the pixel values of multiple pixels in the to-be-processed image in the mapping table to obtain mapped values corresponding to the pixels.

In some embodiments, the parallel table lookup may be a NEON-based parallel table lookup or other parallel table lookups, such as a parallel table lookup algorithm based on C language. The present disclosure is not limited thereto. Through the parallel table lookup, multiple table lookups can be realized by one instruction, which reduces the complexity of instructions and reduces the time consumption of table lookups.

In some embodiments, a NEON-based parallel table lookup is preferably used. NEON is an ARM technique based on the idea of Single Instruction Multiple Data (SIMD). NEON combines 64-bit and 128-bit SIMD instruction sets to provide 128-bit wide vector operations. ARM's NEON technique is essentially an advanced SIMD architecture extension. SIMD is a parallel processing technique where one instruction can process multiple data in parallel, which, compared with one instruction processing one data, providing a improved computing speed. Many programs need to process large data sets, many of which are stored in fewer than 32 bits, such as 8-bit pixel data in video, graphics, and image processing. In situations such as the above ones, it is likely that numerous simple and repetitive operations are involved while few control codes are provided, and SIMD is good at providing higher performance for such programs.

NEON can be realized by calling an instruction set, i.e., NEON Assembler, or by calling a function, i.e., NEON Intrinsics, which is not limited herein.

NEON allows the CPU to process multiple data in parallel within one instruction cycle, saving algorithm processing time. In some embodiments, a NEON-based parallel table lookup is performed on the pixel values of multiple pixels in the to-be-processed image in the mapping table. Specifically, the pixel values of the multiple pixels can be written into a register. Based on the NEON instruction, the CPU is caused to perform the same and parallel table lookup for the pixel values of the multiple pixels, i.e., NEON-based parallel table lookup, so that multiple table lookups can be realized through one instruction, reducing the complexity of the instruction and the time consumption of table lookup.

In S506, the encoder determines a mapped image corresponding to the to-be-processed image according to the mapped values obtained based on the table lookup operation.

In some embodiments, the pixel value of the pixel can be replaced with the mapped value obtained based on the table lookup operation, so as to obtain the mapped image corresponding to the to-be-processed image, which is not limited herein.

Figure 5B:
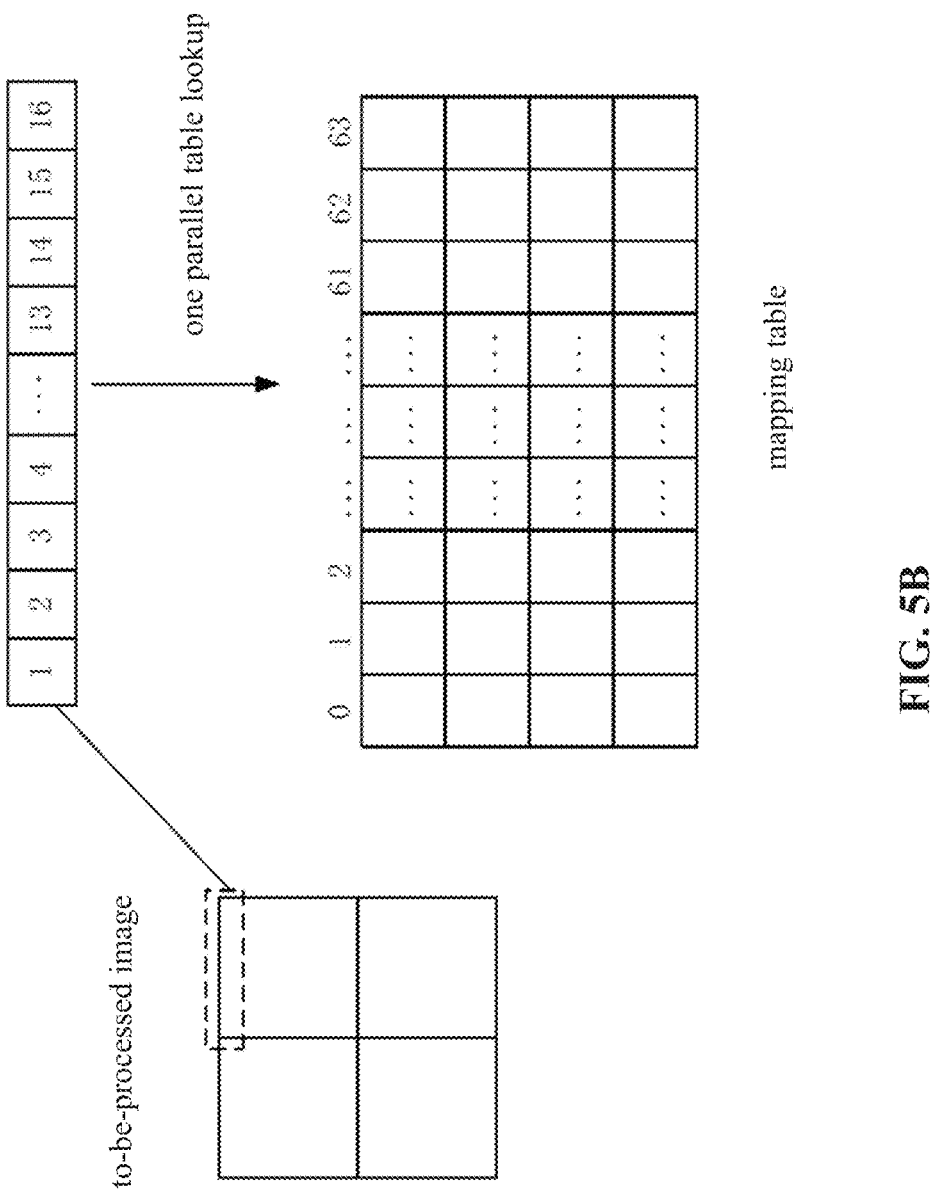
FIG. 5B is a schematic diagram illustrating an exemplary usage scenario according to some embodiments of the present disclosure.

FIG. 5B is a schematic diagram illustrating an exemplary usage scenario according to some embodiments of the present disclosure. The to-be-processed image, which may be of a size of 32*32, can be divided into four 16*16 image blocks. For each image block, one parallel table lookup may be performed on the pixel values of 16 pixels in the mapping table of 0-255 with a degree of parallelism of 16. Specifically, referring to FIG. 5B, a parallel table lookup can be performed on the pixel values corresponding to one row of pixels in the image block each time. The query is repeated 16 times to obtain the mapped values corresponding to the pixels in an image block. The operation is repeated 16*4 times to obtain the mapped values corresponding to the pixels in the image block.

If the method of querying one pixel at a time is used, then query of the mapped values corresponding to the to-be-processed image requires 32*32 table lookups. However, using the method provided in some embodiments, through parallel table lookups, 16*4 parallel table lookups can be performed to query the mapped values corresponding to the to-be-processed image, which can improve the table lookup efficiency and reduce the complexity.

According to some embodiments of the present disclosure, a method includes the following steps is provided: determining a to-be-processed image and a mapping table corresponding to the to-be-processed image; performing a parallel table lookup on the pixel values of multiple pixels in the to-be-processed image in the mapping table to obtain the mapped values corresponding to the pixels; and finally determining the mapped image corresponding to the to-be-processed image according to the mapped values obtained based on the table lookup operation. Since the parallel table lookup supports execution of parallel table lookup in response to one instruction, mapped values corresponding to pixel values of multiple pixels can be queried in the mapping table at one time through the parallel table lookup, which can reduce the complexity of the instructions involved in the process of table lookup and improve the efficiency of table lookup.

In comparison, in LMCS, LCU is used as the unit for Luma Mapping. As described above, LMCS mainly includes Luma Mapping (LM) based on the adaptive piecewise linear model and luma-based Chroma Scaling (CS). By making full use of the luma value range and photoelectric conversion characteristics to improve video coding efficiency, Luma Mapping is applied to the pixel level. LCU, also known as the largest coding unit, is an equal-sized image block obtained by dividing the image. Taking the LCU size of 128×128 as an example, forward mapping of one LCU requires 16384 (128×128) table lookups, and the decoding process requires both inverse mapping and forward mapping, so 32768 (16384×2) table lookups are required. Using the solution provided in some embodiments of the present disclosure, if the degree of parallelism of the parallel table lookup is 16, then forward mapping of one LCU only requires 1024 (128×128/16) table lookups, and inverse mapping and forward mapping only require 2048 (1024×2) table look-ups in total, which is only $\frac{1}{16}$ of the original number of table look-ups. The corresponding number of instructions can be reduced accordingly, thereby reducing the complexity of the instructions in the table look-up process and improving the processing speed and efficiency of the table lookup process.

FIG. 6A is a flow chart illustrating steps of an exemplary pixel value mapping method 600 according to some embodiments of the present disclosure. Specifically, pixel value mapping method 600 may include the following steps S602 to S610, which can be implemented by an encoder or a decoder as described above, e.g., image/video encoder 124, image/video decoder 144 in FIG. 1, or apparatus 400 in FIG. 4. Here, an encoder is configured to implement the following steps S602 to S610 as an example.

In step S602, the encoder determines a to-be-processed image and a mapping table corresponding to the to-be-processed image.

In step S604, the encoder compares pixel values of the multiple pixels to determine a maximum pixel value and minimum pixel value.

In some embodiments, the to-be-processed image can be divided into several image blocks of a basic size, such as 16*16 image blocks or 8*8 image blocks, and then the pixel values of the multiple pixels in the image blocks are compared in the units of image blocks to determine the maximum pixel value and minimum pixel value.

In some embodiments, the comparison can be implemented through the algorithm coded in C language, or the like, or can be implemented based on NEON, which are both within the protection scope of the present disclosure.

In some embodiments, in order to save the computational complexity, the comparison can be preferably implemented based on NEON. For example, based on the degree of parallelism of NEON, multiple pixel values can be compared simultaneously to obtain multiple candidate maximum values or candidate minimum values as the result of the primary comparison, and then the multiple candidate maximum values or candidate minimum values can be secondarily compared to obtain the maximum pixel value and minimum pixel value.

When determining the maximum pixel value and the minimum pixel value through NEON assembly, the step S604 may include the following sub-steps: initializing a maximum value register and a minimum value register, where the number of pixel values stored in the maximum value register or the minimum value register is i, and the number of the multiple pixels is n times the number of pixel values i, n being a positive integer; dividing the pixel values of the multiple pixels into n groups of to-be-compared pixel values, where each group of to-be-compared pixel values includes i pixel values; comparing each group of the to-be-compared pixel values with the pixel values stored in the maximum value register bit by bit, and updating i pixel values stored in the maximum value register according to the maximum value in the comparison result; and comparing each group of the to-be-compared pixel values with the pixel values stored in the minimum value register bit by bit, and updating i pixel values stored in the minimum value register according to the minimum value in the comparison result; and determining the maximum pixel value from the i pixel values stored in the maximum value register, and determining the minimum pixel value from the i pixel values stored in the minimum value register.

For example, the maximum value register and the minimum value register can be initialized through the vdupq_n_u8 instruction. When the bit depth is 8, the minimum value register can be initialized to 255, or initialized to the first group of to-be-compared pixel values. Similarly, the maximum value register can be initialized to 0, or initialized to the first group of to-be-compared pixel values.

If the minimum value register is initialized to 255, and the maximum value register is initialized to 0, then the first group of to-be-compared pixel values can be compared with 255, and the pixel value stored in the minimum value register can be updated according to the minimum value in the comparison result. Similarly, the first group of to-be-compared pixel values can be compared with 0, and the pixel value stored in the maximum value register can be updated according to the maximum value in the comparison result.

In some embodiments, i pixel values are stored in the maximum value register or the minimum value register. Each group of to-be-compared pixel values includes i pixel values. Taking the maximum value register as an example, the aligned comparison includes: comparing the $1^{st}$ pixel value in the maximum value register with the $1^{st}$ of the to-be-compared pixel values, and comparing the $2^{nd}$ bit pixel value in the maximum value register with the $2^{nd}$ of the to-be-compared pixel values, and so on.

After the comparison of the last group of the to-be-compared pixel values is completed, the i pixel values in the maximum value register can be compared to obtain the maximum pixel value, and the i pixel values in the minimum value register can be compared to obtain the minimum pixel value.

If the number of the multiple pixels is not n times the number of pixel values i, but rather is between n times and n+1 times, then the multiple pixels can be divided into n+1 groups of to-be-queried pixel values, where the number of pixels included in each of the n groups is i, and the number of pixels included in the (n+1)th group is less than i. Each of the n group of the to-be-compared pixel values is compared with the pixel values stored in the maximum value register bit by bit, and the i pixel values stored in the maximum value register are updated according to the maximum value in the comparison result. Each group of the of the to-be-compared pixel values is compared with the pixel values stored in the minimum value register bit by bit, and the i pixel values stored in the minimum value register are updated according to the minimum value in the comparison result. Then the maximum pixel value is determined from the pixels in the n+1 groups and the i pixel values stored in the maximum value register, and the minimum pixel value is determined from the pixels in the n+1 groups and the i pixel values stored in the minimum value register.

In step S606, the encoder determines a first sub-table of a pixel value range corresponding to the maximum pixel value and the minimum pixel value from the mapping table.

In some embodiments, after the maximum pixel value and the minimum pixel value are determined, the number of pixel values $val_{range}$ can be calculated based on:

$$val_{range} = \max{}_{val} - \min{}_{val} \qquad (3)$$

where $\max{}_{val}$ is the maximum pixel value, and $\min{}_{val}$ is the minimum pixel value.

After the number of pixel values is determined, the first sub-table of the pixel value range corresponding to the maximum pixel value and the minimum pixel value can be determined from the mapping table. That is, the starting index value of the first sub-table is the same as the minimum pixel value, and the ending index value of the sub-table is the same as the maximum pixel value.

According to some embodiments of the present disclosure, the maximum pixel value and the minimum pixel value can be pre-calculated through statistics, and then the first sub-table of the corresponding pixel value range can be determined according to the maximum pixel value and the minimum pixel value. Table lookups can be performed in the first sub-table via subsequent steps. As such, the range of the mapping table that needs to be queried can be narrowed down, and the number of uses of neon assembly instructions can be reduced.

In some embodiments, step S606 may include the following sub-steps: determining the number of pixel values of the first sub-table according to the difference between the maximum pixel value and the minimum pixel value; and determining the first sub-table from the mapping table according to the number of pixel values starting from the minimum pixel value.

In some embodiments, the content in the mapping table can be loaded into the register starting from the minimum pixel value, and the loading is stopped after loading up to the number of indexes corresponding to the number of pixel values in the first sub-table, thus the first sub-table is loaded into the register, and parallel table lookups are subsequently performed through NEON assembly instructions based on the register.

Figure 6B:
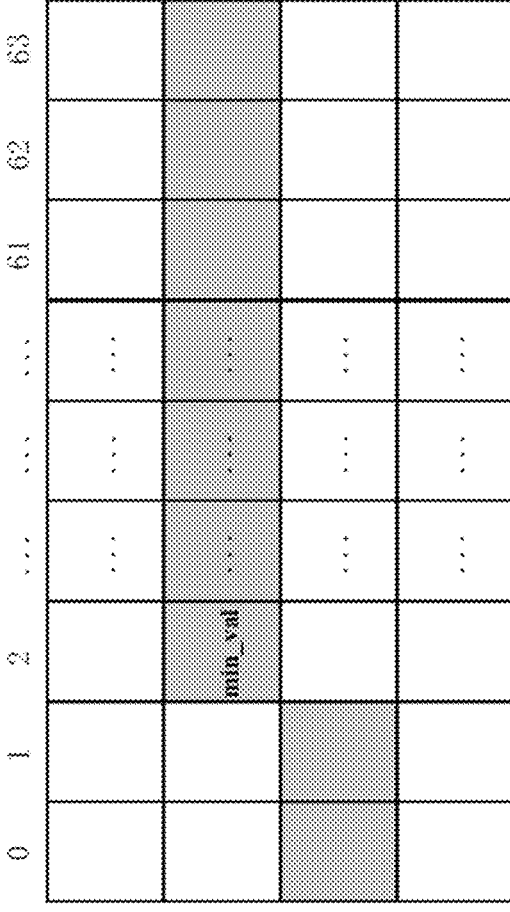
FIG. 6B is a schematic diagram illustrating an exemplary mapping table according to some embodiments of the present disclosure.

FIG. 6B is a schematic diagram illustrating an exemplary mapping table according to some embodiments of the present disclosure. When loading the mapping table, starting from the position marked with $\min{}_{val}$ in the figure, the mapping table is loaded into the register until $val_{range}$ number of table elements are loaded. In the figure, the mapping table that is loaded into the register as the first sub-table is marked in gray. FIG. 6B shows only an example of a mapping table and not intend to limit the protection scope of the present disclosure.

In step S608, the encoder performs a parallel table lookup on pixel values of the multiple pixels in the first sub-table to obtain mapped values corresponding to the pixels.

Specifically, in some embodiments, if the number of the multiple pixels is m times of a degree of parallelism of the parallel table lookup, m being a positive integer, then step S608 may include the following sub-steps: dividing the pixel values of the multiple pixels into m groups of to-be-queried pixel values according to the degree of parallelism; and performing a NEON-based parallel table lookup on the to-be-queried pixel values in the first sub-table by groups to obtain the mapped values corresponding to the pixels.

If the number of multiple pixels is not m times of a degree of parallelism of the parallel table lookup, but rather is between m times and m+1 times, then the pixel values of the multiple pixels can be divided into m+1 groups of to-be-queried pixel values according to the degree of parallelism, where the number of pixels included in each of the m groups is the same as the degree of parallelism, and the number of pixels included in the $(m+1)^{th}$ group is less than the degree of parallelism. The NEON-based parallel table lookup is performed on the to-be-queried pixel values in the first sub-table by groups to obtain the mapped values corresponding to the pixels.

The degree of parallelism may be the number of pixel values that can be queried in response to one instruction. In some embodiments, the degree of parallelism may be 2, 3, 16, etc., which are all within the protection scope of the present disclosure.

In some embodiments, multiple pixel values can be divided into m groups, and the parallel table lookup is performed in the first sub-table by groups, further improving the query efficiency.

In some embodiments, performing a NEON-based parallel table lookup on the to-be-queried pixel values in the first sub-table by groups to obtain mapped values corresponding to the pixels may include the following sub-steps: segmenting the first sub-table to obtain multiple second sub-tables; performing a NEON-based parallel table lookup on the to-be-queried pixel values in the multiple second sub-tables by groups to obtain multiple sets of query results corresponding to respective groups of the to-be-queried pixel values; and merging the multiple sets of query results to obtain respective mapped values corresponding to respective groups of the to-be-queried pixel values.

In some embodiments, there may be an upper limit on the size of the sub-table loaded to the register and the largest table loaded to the register can be 64, if the first sub-table is larger than the upper limit of loading, then the first sub-table can be segmented to obtain multiple second sub-tables. Segmentation can ensure that the size of the second sub-table does not exceed the upper limit of loading. After that, the NEON-based parallel table lookup can be performed on the to-be-queried pixel values in the multiple second sub-tables by groups to obtain multiple sets of query results corresponding to respective groups of the to-be-queried pixel values; and the multiple sets of query results are merged to obtain respective mapped values corresponding to respective groups of the to-be-queried pixel values. Since one to-be-queried pixel value corresponds to one mapped value, the one mapped value corresponding to the to-be-queried pixel value exists in one of the multiple sets of query results. By merging the multiple sets of query results, the query result corresponding to the set of to-be-queried pixel values can be obtained.

In step S610, the encoder determines the mapped image corresponding to the to-be-processed image according to the mapped value obtained based on the table lookup operation.

Figure 6C:
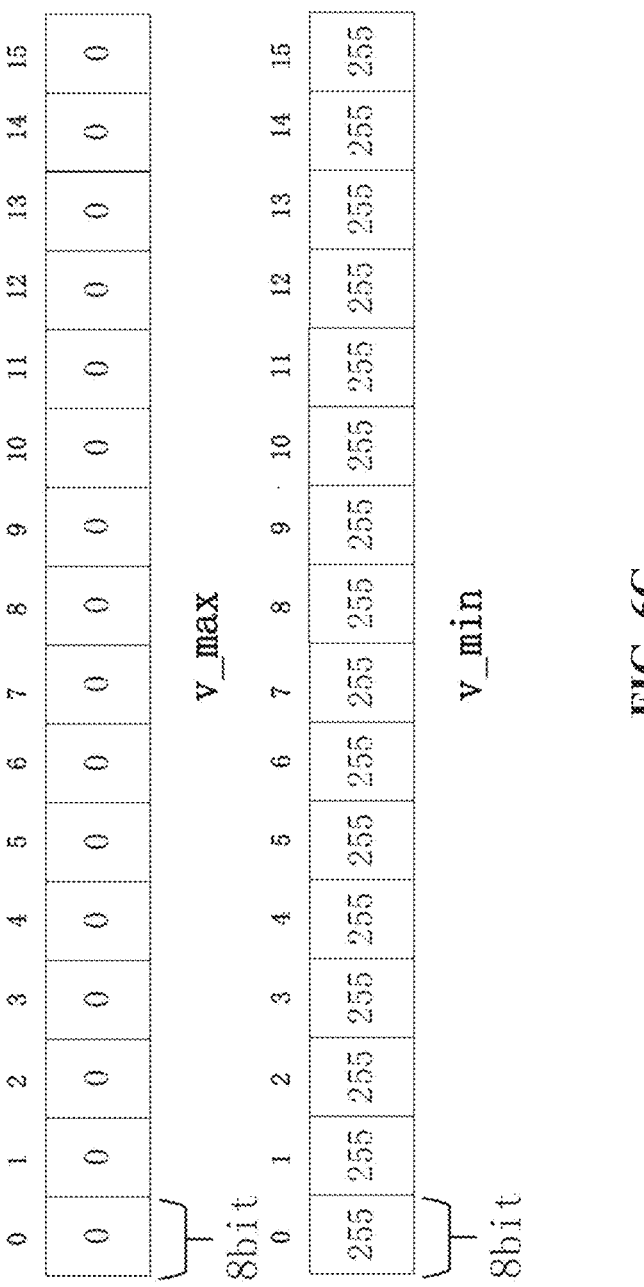
FIG. 6C is a schematic diagram illustrating an exemplary initialized register according to some embodiments of the present disclosure.

For example, taking the pixel values of 16*16 pixels and i being 16 as an example. The 16*16 pixel values can be divided into 16 groups, each group has 16 pixel values, and the number of pixel values stored in the maximum value register and the minimum value register is 16. The maximum value register and the minimum value register can be initialized as shown in FIG. 6C.

After that, the first group of 16 to-be-compared pixel values can be loaded into the register variable v_src through the vldlq_u8 instruction, and the vminq_u8 instruction can be used to compare the register variable v_src and the minimum value register bit by bit, and update the minimum value obtained by the comparison into the minimum value register; and the vmaxq_u8 instruction can be used to compare the register variable v_src and the maximum value register bit by bit, and update the maximum value obtained by comparison into the maximum value register.

After the comparison is completed, the second group of 16 to-be-compared pixel values can be loaded into the register variable v_src through the vldlq_u8 instruction, and the comparison is continued. This operation is repeated until comparison of the 16th group of the to-be-compared pixels is completed.

Then the maximum pixel value $max_{val}$ is found among the 8 pixel values stored in the maximum value register through the vpmax_u8 instruction. The vpmin_u8 instruction can be used to find the minimum pixel value $min_{val}$ among the 8 pixel values stored in the minimum value register.

In some embodiments, after the maximum pixel value and the minimum pixel value are determined, the number of pixel values $val_{range}$ can be calculated based on the formula (3) as described above.

After that, it can be determined whether to segment the first sub-table to obtain multiple second sub-tables based on the size of $val_{range}$.

Figure 6D:
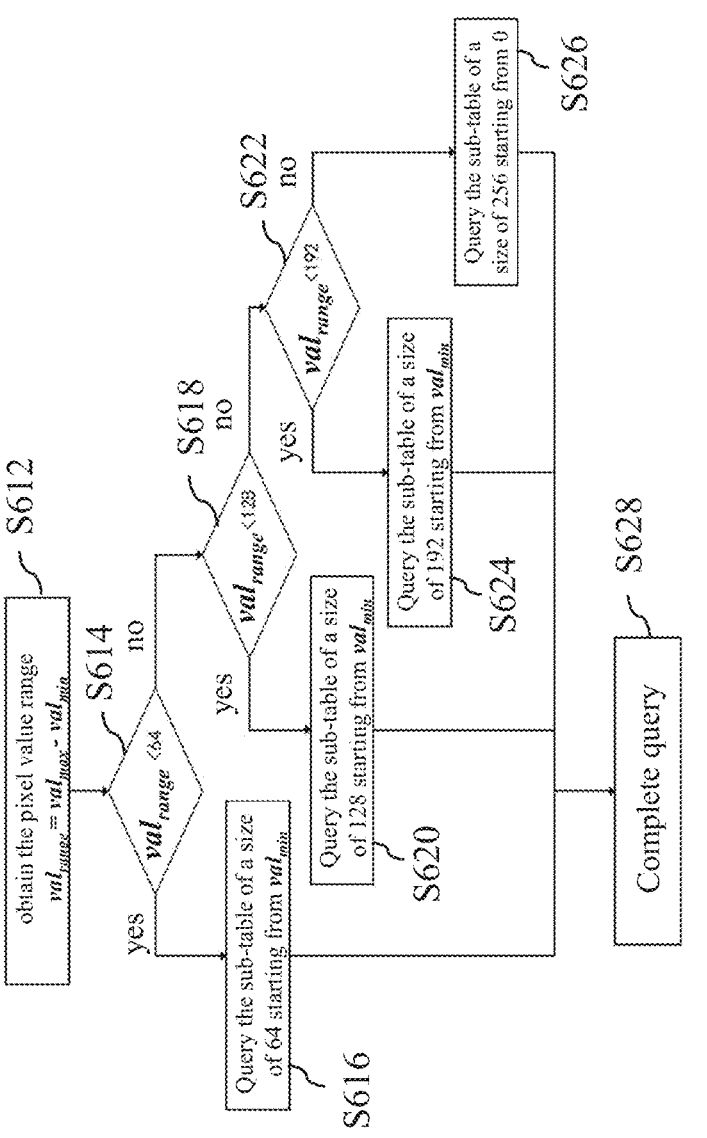
FIG. 6D is a schematic diagram illustrating steps of determining a first sub-table from a mapping table with a size of 256, according to some embodiments of the present disclosure.

FIG. 6D is a schematic diagram illustrating steps of determining a first sub-table from a mapping table with a size of 256, according to some embodiments of the present disclosure. As shown in FIG. 6D, if the bit depth is 8, then the size of the mapping table is 256, and the register can be loaded with a table of a size up to 64. Therefore, the multiple relationship between the number of pixel values $val_{range}$ and 64 can be determined.

As shown in FIG. 6D, the pixel value range can be determined in step S612 according to the formula described above. The process then goes into step S614 for comparison.

If the number of pixel values $val_{range} < 64$ is determined in step S614, there is no need to segment the first sub-table and the process goes into step S616. If not, the process goes into step S618 for a further comparison.

In step S616, starting from $min_{val}$, the pixel value number of $val_{range}$ indexes or 64 indexes can be loaded into the register to obtain the first sub-table tab0, and the parallel table lookup can be performed based on the loaded first sub-table tab0. After that, the query is completed in step S628.

Specifically, a set of 16 to-be-queried pixel values can be loaded into the register variable xSrc through the vldlq_u8 instruction, and then the difference between xSrc and $min_{val}$ can be obtained through the vsubq_u8 instruction to index and align the to-be-queried pixel values with the first sub-table. Afterwards, through the vqtb14q_u8 instruction, the parallel table lookup of the 16 pixel values in Src in the first sub-table tab0 can be completed, and the respective mapped values corresponding to the 16 pixel values can be obtained and saved in the 128-bit register variable xMapVal0. Finally, the value of xMapVal0 is stored back into the memory by using the vst1q_u8 instruction. Then the step of loading a set of 16 to-be-queried pixel values into the register variable xSrc through the vldlq_u8 instruction is repeated until query of multiple sets of to-be-queried pixel values is completed.

If the number of pixel values $val_{range} < 64*2$ is determined in step S618, then the first sub-table needs to be segmented to obtain two second sub-tables in step S620. If not, the process goes into step S622 for a further comparison.

In step S620, starting from $min_{val}$ and $min_{val}+64$, 64 indexes can be loaded into the register to obtain two second sub-tables, e.g., tab1 and tab2, respectively. A parallel table lookup can be performed based on the loaded second sub-tables tab1 and tab2. After that, the query is completed in step S628.

Specifically, a set of 16 to-be-queried pixel values can be loaded into the register variable xSrc through the vldlq_u8 instruction. For the first second sub-table, the difference between xSrc and $min_{val}$ can be obtained through the vsubq_u8 instruction to index and align the to-be-queried pixel values with the first second sub-table tab1. Moreover, the difference between xSrc and $min_{val}+64$ can be obtained through the vsubq_u8 instruction to index and align the to-be-queried pixel values with the second sub-table tab2.

Through the vqtb14q_u8 instruction, the parallel table lookup of the 16 pixel values in Src in the first second sub-table tab1 is completed, and the respective mapped values xVal_1 corresponding to the 16 pixel values in the first second sub-table, i.e., the first group of query results, can be obtained. Similarly, the mapped values xVal_2 corresponding to the 16 pixel values in the second second sub-table, i.e., the second group of query results, can be obtained.

Afterwards, xVal_1 and xVal_2 can be merged through bitwise or operation or maximum value solving operation to obtain the mapped value dst_0 of the 16 pixel values in xSrc in the first sub-table of size 128.

Finally, the value of dst_0 is stored back into the memory by using the vst1q_u8 instruction.

Then the step of loading a set of 16 to-be-queried pixel values into the register variable xSrc through the vldlq_u8 instruction is repeated until the query of multiple sets of to-be-queried pixel values is completed.

If the number of pixel values $val_{range} < 64*3$ is determined in step S622, then the first sub-table needs to be segmented to obtain three second sub-tables in step S624.

If the number of pixel values $val_{range} \geq 64*3$ is determined in step S622, then the first sub-table needs to be segmented to obtain four second sub-tables in step S626.

In steps S624 and S626, the calculation process of obtaining three or four second sub-tables through segmentation is similar to the above-mentioned process of obtaining two second sub-tables through segmentation, and is described again here. After that, the query is completed in step S628.

Since the size of the mapping table in some embodiments can be 256, that is, 64*4, the determination is made until 64*3, and 64*4 is no longer necessarily determined herein. If the size of the mapping table is another value, it is appreciated that the determination criteria including other multiples can be set as appropriate, which is also within the protection scope of the present disclosure.

According to some embodiments, the maximum pixel value and the minimum pixel value can be pre-calculated through statistics, and then the first sub-table of the pixel value range corresponding to the maximum pixel value and the minimum pixel value is determined. A table lookup can be performed in the first sub-table via subsequent steps. As such, the range of the mapping table that needs to be queried is narrowed down, and the number of uses of neon assembly instructions is reduced. Furthermore, during parallel table lookups, the first sub-table is segmented to obtain multiple second sub-tables according to the difference between the maximum pixel value and the minimum pixel value, and parallel table lookups are performed based on the multiple second sub-tables, further reducing the number of uses of neon assembly instructions.

FIG. 7 is a flow chart illustrating steps of an exemplary pixel value mapping method 700 according to some embodiments of the present disclosure. Specifically, pixel value mapping method 700 may include the following steps S702 to S710, which can be implemented by an encoder or a decoder as described above, e.g., image/video encoder 124, image/video decoder 144 in FIG. 1, or apparatus 400 in FIG. 4. Here, an encoder is configured to implement the following steps S702 to S710 as an example.

In step S702, the encoder determines a to-be-processed image and the mapping table corresponding to the to-be-processed image.

In step S704, the encoder segments the mapping table to obtain multiple third sub-tables.

In step S706, the encoder performs parallel table lookups on the pixel values of the multiple pixels in the multiple third sub-tables respectively to obtain multiple sets of query results.

In step S708, the encoder merges multiple sets of the query results to obtain respective mapped values corresponding to the multiple pixels.

In step S710, the encoder determines the mapped image corresponding to the to-be-processed image according to the mapped value obtained based on the table lookup operation.

In some embodiments, if the bit depth is 8, then the size of the mapping table is 256, and the register can be loaded with a table of a size up to 64. Therefore, the mapping table can be segmented to obtain four third sub-tables.

Starting from 0, 0+64, 0+64*2 and 0+64*3, 64 indexes can be loaded into the register to obtain four third sub-tables, e.g., tab1, tab2, tab3 and tab4, respectively. Parallel table lookups can be performed based on the loaded third sub-tables tab1, tab2, tab3 and tab4.

Specifically, a set of 16 to-be-queried pixel values can be loaded into the register variable xSrc through the vldlq_u8 instruction.

For the first third sub-table, the difference between xSrc and 0 can be obtained through the vsubq_u8 instruction to index and align the to-be-queried pixel values with the first third sub-table tab1. For the second third sub-table, the difference between xSrc and 0+64 can be obtained through the vsubq_u8 instruction to index and align the to-be-queried pixel values with the second third sub-table tab2. For the third third sub-table, the difference between xSrc and 0+64*2 can be obtained through the vsubq_u8 instruction to index and align the to-be-queried pixel values with the third third sub-table tab3. For the fourth third sub-table, the difference between xSrc and 0+64*4 can be obtained through the vsubq_u8 instruction to index and align the to-be-queried pixel values with the fourth third sub-table tab3.

Through the vqtb14q_u8 instruction, a parallel table lookup of the 16 pixel values in Src in the first third sub-table tab1 is completed, and the respective mapped values xVal_1 corresponding to the 16 pixel values in the first third sub-table, i.e., the first group of query results, can be obtained. Similarly, the respective mapped values xVal_2 corresponding to the 16 pixel values in the second third sub-table, i.e., the second group of query results, and the third group of query results xVal_3 and the fourth group of query results xVal_4, can be obtained.

Afterwards, xVal_1, xVal_2, xVal_3 and xVal_4 can be merged through bitwise or operation or maximum value solving operation to obtain the mapped value dst_0 of the 16 pixel values in xSrc in the mapping table of size 256.

Finally, the value of dst_0 can be stored back into the memory through the vst1q_u8 instruction.

Then the step of loading a set of 16 to-be-queried pixel values into the register variable xSrc through the vldlq_u8 instruction is repeated until the query of multiple sets of to-be-queried pixel values is completed.

In some embodiments, the mapping table can be segmented to obtain multiple third sub-tables during the parallel table look-up, and parallel table look-ups are performed based on the multiple third sub-tables, further reducing the number of times of uses of neon assembly instructions.

FIG. 8 is a flow chart illustrating steps of an exemplary encoding method 800 according to some embodiments of the present disclosure. Specifically, encoding method 800 may include the following steps S802 to S806, which can be implemented by an encoder as described above, e.g., image/video encoder 124 in FIG. 1, or apparatus 400 in FIG. 4. In S802, the encoder determines a to-be-processed image block.

In S804, the encoder converts the luma component of the to-be-processed image block from the original domain to the mapped domain through forward mapping. After image processing, the encoder converts the luma component of the to-be-processed image block from the mapped domain to the original domain through inverse mapping. At least one of the forward mapping and the inverse mapping can be implemented by the method described in the context of the present disclosure.

In S806, the encoder encodes according to the mapped luma component to obtain a code stream.

For various steps in some embodiments, reference may be made to the corresponding description of the corresponding steps and units in the foregoing method embodiments, and corresponding beneficial effects are provided, which is described again here. It is appreciated that for the convenience and simplicity of description, for the specific operating processes of the devices and modules described above, reference may be made to the corresponding description of processes in the foregoing method embodiments, and description thereof will not be made again here.

According to some embodiments of the present disclosure, by determining a to-be-processed image and a mapping table corresponding to the to-be-processed image; and performing a parallel table lookup on pixel values of multiple pixels in the to-be-processed image in the mapping table to obtain mapped values corresponding to the pixels; and finally determining the mapped image corresponding to the to-be-processed image according to the mapped value obtained based on the table lookup operation, since the parallel table lookup supports execution of a parallel table lookup in response to one instruction, mapped values corresponding to the pixel values of the multiple pixels can be queried in the mapping table at one time through the parallel table lookup, which reduces the complexity of the instructions involved in the process of table lookup and improves the efficiency of table lookup in the processes of encoding and decoding.

FIG. 9 is a flow chart illustrating steps of an exemplary decoding method 900 according to some embodiments of the present disclosure. Specifically, decoding method 900 may include the following steps S902 to S906, which can be implemented by a decoder as described above, e.g., image/video decoder 144 in FIG. 1, or apparatus 400 in FIG. 4.

In step S902, the decoder decodes a code stream to obtain the to-be-processed image block.

In step S904, the decoder converts the luma component of the to-be-processed image block from the original domain to the mapped domain through forward mapping. After image processing, the decoder converts the luma component of the to-be-processed image block from the mapped domain to the original domain through inverse mapping. At least one of the forward mapping and the inverse mapping is implemented by the method described in the foregoing embodiments.

In step S906, the decoder decodes according to the mapped luma component to obtain the video frame.

For various steps in some embodiments, reference may be made to the corresponding description of the corresponding steps and units in the foregoing method embodiments, and corresponding beneficial effects are provided, which will not be described again here. It is appreciated that for the convenience and simplicity of description, for the specific operating processes of the devices and modules described above, reference may be made to the corresponding description of processes in the foregoing method embodiments, and description thereof will not be made again here.

According to some embodiments of the present disclosure, by determining a to-be-processed image and a mapping table corresponding to the to-be-processed image; and performing a parallel table lookup on pixel values of multiple pixels in the to-be-processed image in the mapping table to obtain mapped values corresponding to the pixels; and finally determining the mapped image corresponding to the to-be-processed image according to the mapped value obtained based on the table lookup operation, since the parallel table lookup supports execution of a parallel table lookup in response to one instruction, mapped values corresponding to the pixel values of the multiple pixels can be queried in the mapping table at one time through the parallel table lookup, which reduces the complexity of the instructions involved in the process of table lookup and improves the efficiency of table lookup in the processes of encoding and decoding.

The pixel value mapping solution or encoding and decoding solution provided by any of the foregoing embodiments of the present disclosure can be performed by the video encoding end (encoder) when encoding the video stream to improve the processing efficiency of the encoding process. It can be applied to a variety of different scenarios, such as storage and streaming of conventional video games. Specifically, each image block in the video frame can be mapped through the pixel value mapping solution provided by some embodiments of the present disclosure (for example, forward mapping or inverse mapping), and video code streams are generated according to the mapping results for storage and transmission in video streaming services or other similar applications. Another example is low-latency scenarios such as video conferencing and live video broadcasting, specifically: conference video data can be captured through a video capture device, and then each image block in the video frame can be mapped through the method provided by some embodiments of the present disclosure (such as forward mapping or inverse mapping), and a video code stream can be generated according to the mapping results and sent to the conference terminal. The conference terminal decodes the video code stream to obtain the corresponding conference video picture. Specifically, in decoding, the conference terminal can also map the luma component of the image block (such as through forward mapping or inverse mapping). As yet another example, in a virtual reality scene, each image block in the video frame can be mapped through the method provided by some embodiments of the present disclosure (such as forward mapping or inverse mapping), and a video code stream can be generated according to the mapping result and sent to a virtual reality related device (such as VR virtual glasses, etc.). The video code stream is decoded through the VR device to obtain the corresponding video picture, and the corresponding VR function is implemented based on the video picture, etc. Specifically, in decoding, the luma component of the image block can also be mapped by the VR device (such as through forward mapping or inverse mapping).

Figure 10:
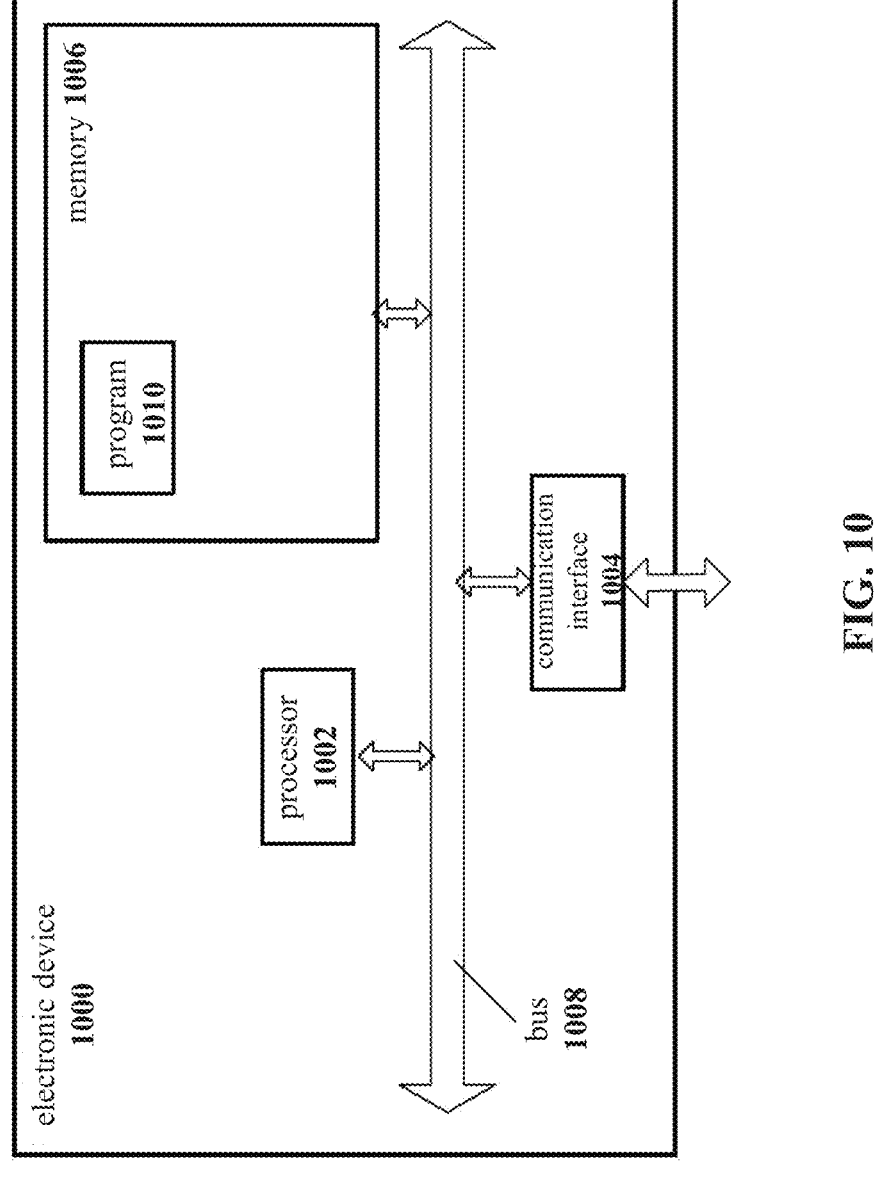
FIG. 10 is a schematic structural diagram of an exemplary electronic device according to some embodiments of the present specification.

FIG. 10 is a schematic structural diagram of an exemplary electronic device 1000 according to some embodiments of the present specification. Some embodiments of the present disclosure does not limit the specific implementation of electronic device 1000.

As shown in FIG. 10, electronic device 1000 may include a processor 1002 (which can be one or more processors), a communication interface 1004, a memory 1006, and a communication bus 1008. Processor 1002, communication interface 1004, and memory 1006 communicate with each other through communication bus 1008.

Communication interface 1004 is configured to communicate with other electronic devices or servers.

Processor 1002 is configured to execute program 1010. Specifically, it can execute relevant steps in the above-mentioned embodiments of the pixel value mapping method or encoding and decoding method.

Specifically, program 1010 may include a program code that includes computer operation instructions.

Processor 1002 may be a CPU, a graphics processing unit (GPU), an infrastructure processing unit (IPU), a neural processing unit (NPU), or an Application Specific Integrated Circuit (ASIC), or one or more integrated circuits configured to implement embodiments of the present disclosure. The one or more processors included in a smart device may be the same type of processor, such as one or more CPUs; or they may be different types of processors, such as one or more CPUs and one or more ASICs.

Memory 1006 is configured to store program 1010. Memory 1006 may include a high-speed random access memory (RAM), and may also include a non-volatile memory, such as at least one disk memory.

Program 1010 may include multiple computer instructions. Specifically, program 1010 may use the multiple computer instructions to cause processor 1002 to perform operations corresponding to the pixel value mapping method or encoding and decoding method described in any of the foregoing method embodiments.

For each step in the program 1010, reference may be made to the corresponding description of the corresponding steps and units in the foregoing method embodiments, and corresponding beneficial effects are provided, which will not be described again here. It is appreciated that for the convenience and simplicity of description, for the specific operating processes of the above-described devices and modules, reference may be made to the corresponding description of processes in the foregoing method embodiments, and is not described here again.

Some embodiments of the present specification further provide a computer-readable storage medium having a computer program stored thereon which, when executed by a processor, implement the method described in any of the methods described above. The computer storage medium includes but is not limited to: Compact Disc Read-Only Memory (CD-ROM), Random Access Memory (RAM), floppy disk, hard disk or magneto-optical disk, etc.

Some embodiments of the present disclosure further provide a computer program product including computer instructions. The computer instructions instruct the computing device to perform operations corresponding to any method in the foregoing method embodiments.

In addition, it should be noted that the user-related information (including but not limited to user device information, user personal information, etc.) and data (including but not limited to sample data to train the model, data for analysis, stored data, displayed data, etc.) involved in the embodiments of the present disclosure are all information and data authorized by the user or fully authorized by all parties, and the collection, use and processing of relevant data need to comply with the relevant laws and regulations and standards of relevant countries and regions, and corresponding operation entrances are provided for users to choose to authorize or reject.

It should be noted that according to the needs of implementation, each component/step described in the embodiments of the present disclosure can be split into more components/steps, or two or more components/steps or partial operations of components/steps can be combined into new components/steps to achieve the purpose of the embodiments of the present disclosure.

The foregoing methods according to the embodiments of the present disclosure can be implemented in hardware, firmware, or as software or computer code that can be stored in a recording medium (such as CD-ROM, RAM, floppy disk, hard disk or magneto-optical disk), or implemented as computer codes downloaded over a network that is originally stored in a remote recording medium or non-transitory machine-readable medium and will be stored in a local recording medium, so that the method described herein can be processed by such a software stored on a recording medium using a general-purpose computer, a dedicated processor or programmable or dedicated hardware such as an Application Specific Integrated Circuit (ASIC) or a Field Programmable Gate Array (FPGA). It can be understood that a computer, processor, microprocessor controller or programmable hardware includes a storage component (such as, Random Access Memory (RAM), Read-Only Memory (ROM), flash memory) that can store or receive software or computer codes. When the software or computer codes are accessed and executed by a computer, processor or hardware, the methods described herein are implemented. Furthermore, when a general-purpose computer accesses codes for implementing the methods illustrated herein, execution of the codes converts the general-purpose computer into a special-purpose computer for performing the methods illustrated herein.

The embodiments may further be described using the following clauses:

1. A pixel value mapping method, including:

determining a to-be-processed image and a mapping table corresponding to the to-be-processed image;

performing a table lookup on pixel values of multiple pixels in the to-be-processed image according to the mapping table in parallel to obtain mapped values each corresponding to a pixel of the multiple pixels; and determining a mapped image corresponding to the to-be-processed image according to the mapped values obtained based on the table lookup.

2. The method according to clause 1, further including:

comparing the pixel values of the multiple pixels to determine a maximum pixel value and a minimum pixel value; and wherein performing the table lookup on the pixel values of the multiple pixels in the to-be-processed image according to the mapping table in parallel to obtain the mapped values each corresponding to a pixel of the multiple pixels includes:

determining a first sub-table of a pixel value range corresponding to the maximum pixel value and the minimum pixel value from the mapping table; and performing the table lookup on the pixel values of the multiple pixels according to the first sub-table in parallel to obtain the mapped values each corresponding to a pixel of the multiple pixels.

3. The method according to clause 2, wherein the number of the multiple pixels is m times of a degree of parallelism of the parallel table lookup, m being a positive integer, and performing the table lookup on the pixel values of the multiple pixels according to the first sub-table in parallel to obtain the mapped values each corresponding to a pixel of the multiple pixels includes:

dividing the pixel values of the multiple pixels into m groups of to-be-queried pixel values according to the degree of parallelism; and performing a NEON-based parallel table lookup on the to-be-queried pixel values according to the first sub-table by groups to obtain the mapped values each corresponding to a pixel of the multiple pixels.

4. The method according to clause 3, wherein performing the NEON-based parallel table lookup on the to-be-queried pixel values according to the first sub-table by groups to obtain the mapped values each corresponding to a pixel of the multiple pixels includes:

segmenting the first sub-table to obtain multiple second sub-tables;

performing the NEON-based parallel table lookup on the to-be-queried pixel values according to the multiple second sub-tables by groups to obtain multiple sets of query results corresponding to respective groups of the to-be-queried pixel values; and merging the multiple sets of query results to obtain respective mapped values corresponding to respective groups of the to-be-queried pixel values.

5. The method according to any of clause 2, wherein comparing the pixel values of the multiple pixels to determine the maximum pixel value and the minimum pixel value includes:

initializing a maximum value register and a minimum value register, where the number of pixel values stored in the maximum value register or the minimum value register is i, and the number of the multiple pixels is n times the number of the pixel values i, n being a positive integer;

dividing the pixel values of the multiple pixels into n groups of to-be-compared pixel values, where each group of the to-be-compared pixel values includes i pixel values;

comparing each group of the to-be-compared pixel values with the pixel values stored in the maximum value register bit by bit, and updating the i pixel values stored in the maximum value register according to the maximum value in the comparison result;

comparing each group of the to-be-compared pixel values with the pixel values stored in the minimum value register bit by bit, and updating the i pixel values stored in the minimum value register according to the minimum value in the comparison result; and determining the maximum pixel value from the i pixel values stored in the maximum value register, and determining the minimum pixel value from the i pixel values stored in the minimum value register.

6. The method according to clause 2, wherein determining the first sub-table of the pixel value range corresponding to the maximum pixel value and the minimum pixel value from the mapping table includes:

determining the number of pixel values of the first sub-table according to the difference between the maximum pixel value and the minimum pixel value; and determining the first sub-table from the mapping table according to the number of pixel values starting from the minimum pixel value.

7. The method according to clause 1, wherein performing the table lookup on the pixel values of the multiple pixels in the to-be-processed image according to the mapping table in parallel to obtain the mapped values each corresponding to a pixel of the multiple pixels includes:

segmenting the mapping table to obtain multiple third sub-tables;

performing parallel table lookups on the pixel values of the multiple pixels in the multiple third sub-tables respectively to obtain multiple sets of query results; and merging the multiple sets of query results to obtain respective mapped values each corresponding to a pixel of the multiple pixels.

8. An electronic device, including: one or more processors, a memory, a communication interface, and a communication bus, where the one or more processors, the memory, and the communication interface communicate with each other via the communication bus; and the memory is configured to store instructions that are executable by the one or more processors to perform operations for mapping pixel value, the operations including:

determining a to-be-processed image and a mapping table corresponding to the to-be-processed image;

performing a table lookup on pixel values of multiple pixels in the to-be-processed image according to the mapping table in parallel to obtain mapped values each corresponding to a pixel of the multiple pixels; and determining a mapped image corresponding to the to-be-processed image according to the mapped values obtained based on the table lookup.

9. The device according to clause 8, the operations further includes:

comparing the pixel values of the multiple pixels to determine a maximum pixel value and a minimum pixel value; and wherein performing the table lookup on the pixel values of the multiple pixels in the to-be-processed image according to the mapping table in parallel to obtain the mapped values each corresponding to a pixel of the multiple pixels includes:

determining a first sub-table of a pixel value range corresponding to the maximum pixel value and the minimum pixel value from the mapping table; and performing the table lookup on the pixel values of the multiple pixels according to the first sub-table in parallel to obtain the mapped values each corresponding to a pixel of the multiple pixels.

10. The device according to clause 9, wherein the number of the multiple pixels is m times of a degree of parallelism of the parallel table lookup, m being a positive integer, and performing the table lookup on the pixel values of the multiple pixels according to the first sub-table in parallel to obtain the mapped values each corresponding to a pixel of the multiple pixels includes:

dividing the pixel values of the multiple pixels into m groups of to-be-queried pixel values according to the degree of parallelism; and performing a NEON-based parallel table lookup on the to-be-queried pixel values according to the first sub-table by groups to obtain the mapped values each corresponding to a pixel of the multiple pixels.

11. The device according to clause 10, wherein performing the NEON-based parallel table lookup on the to-be-queried pixel values according to the first sub-table by groups to obtain the mapped values each corresponding to a pixel of the multiple pixels includes:

segmenting the first sub-table to obtain multiple second sub-tables;

performing the NEON-based parallel table lookup on the to-be-queried pixel values according to the multiple second sub-tables by groups to obtain multiple sets of query results corresponding to respective groups of the to-be-queried pixel values; and merging the multiple sets of query results to obtain respective mapped values corresponding to respective groups of the to-be-queried pixel values.

12. The device according to clause 9, wherein comparing the pixel values of the multiple pixels to determine the maximum pixel value and the minimum pixel value includes:

initializing a maximum value register and a minimum value register, where the number of pixel values stored in the maximum value register or the minimum value register is i, and the number of the multiple pixels is n times the number of the pixel values i, n being a positive integer;

dividing the pixel values of the multiple pixels into n groups of to-be-compared pixel values, where each group of the to-be-compared pixel values includes i pixel values;

comparing each group of the to-be-compared pixel values with the pixel values stored in the maximum value register bit by bit, and updating the i pixel values stored in the maximum value register according to the maximum value in the comparison result;

comparing each group of the to-be-compared pixel values with the pixel values stored in the minimum value register bit by bit, and updating the i pixel values stored in the minimum value register according to the minimum value in the comparison result; and determining the maximum pixel value from the i pixel values stored in the maximum value register, and determining the minimum pixel value from the i pixel values stored in the minimum value register.

13. The device according to clause 9, wherein determining the first sub-table of the pixel value range corresponding to the maximum pixel value and the minimum pixel value from the mapping table includes:

determining the number of pixel values of the first sub-table according to the difference between the maximum pixel value and the minimum pixel value; and determining the first sub-table from the mapping table according to the number of pixel values starting from the minimum pixel value.

14. The device according to clause 8, wherein performing the table lookup on the pixel values of the multiple pixels in the to-be-processed image according to the mapping table in parallel to obtain the mapped values each corresponding to a pixel of the multiple pixels includes:

segmenting the mapping table to obtain multiple third sub-tables;

performing parallel table lookups on the pixel values of the multiple pixels in the multiple third sub-tables respectively to obtain multiple sets of query results; and merging the multiple sets of query results to obtain respective mapped values each corresponding to a pixel of the multiple pixels.

15. A computer-readable storage medium, storing instructions that are executable by one or more processors of a device to cause the device to perform operations:

determining a to-be-processed image and a mapping table corresponding to the to-be-processed image;

performing a table lookup on pixel values of multiple pixels in the to-be-processed image according to the mapping table in parallel to obtain mapped values each corresponding to a pixel of the multiple pixels; and determining a mapped image corresponding to the to-be-processed image according to the mapped values obtained based on the table lookup.

16. The computer-readable storage medium according to clause 15, the operations further includes:

comparing the pixel values of the multiple pixels to determine a maximum pixel value and a minimum pixel value; and wherein performing the table lookup on the pixel values of the multiple pixels in the to-be-processed image according to the mapping table in parallel to obtain the mapped values each corresponding to a pixel of the multiple pixels includes:

determining a first sub-table of a pixel value range corresponding to the maximum pixel value and the minimum pixel value from the mapping table; and performing the table lookup on the pixel values of the multiple pixels according to the first sub-table in parallel to obtain the mapped values each corresponding to a pixel of the multiple pixels.

17. The computer-readable storage medium according to clause 16, wherein the number of the multiple pixels is m times of a degree of parallelism of the parallel table lookup, m being a positive integer, and performing the table lookup on the pixel values of the multiple pixels according to the first sub-table in parallel to obtain the mapped values each corresponding to a pixel of the multiple pixels includes:

dividing the pixel values of the multiple pixels into m groups of to-be-queried pixel values according to the degree of parallelism; and performing a NEON-based parallel table lookup on the to-be-queried pixel values according to the first sub-table by groups to obtain the mapped values each corresponding to a pixel of the multiple pixels.

18. The computer-readable storage medium according to clause 17, wherein performing the NEON-based parallel table lookup on the to-be-queried pixel values according to the first sub-table by groups to obtain the mapped values each corresponding to a pixel of the multiple pixels includes:

segmenting the first sub-table to obtain multiple second sub-tables;

performing the NEON-based parallel table lookup on the to-be-queried pixel values according to the multiple second sub-tables by groups to obtain multiple sets of query results corresponding to respective groups of the to-be-queried pixel values; and merging the multiple sets of query results to obtain respective mapped values corresponding to respective groups of the to-be-queried pixel values.

19. The computer-readable storage medium according to clause 16, wherein comparing the pixel values of the multiple pixels to determine the maximum pixel value and the minimum pixel value includes:

initializing a maximum value register and a minimum value register, where the number of pixel values stored in the maximum value register or the minimum value register is i, and the number of the multiple pixels is n times the number of the pixel values i, n being a positive integer;

dividing the pixel values of the multiple pixels into n groups of to-be-compared pixel values, where each group of the to-be-compared pixel values includes i pixel values;

comparing each group of the to-be-compared pixel values with the pixel values stored in the maximum value register bit by bit, and updating the i pixel values stored in the maximum value register according to the maximum value in the comparison result;

comparing each group of the to-be-compared pixel values with the pixel values stored in the minimum value register bit by bit, and updating the i pixel values stored in the minimum value register according to the minimum value in the comparison result; and determining the maximum pixel value from the i pixel values stored in the maximum value register, and determining the minimum pixel value from the i pixel values stored in the minimum value register.

20. The computer-readable storage medium according to clause 16, wherein determining the first sub-table of the pixel value range corresponding to the maximum pixel value and the minimum pixel value from the mapping table includes:

determining the number of pixel values of the first sub-table according to the difference between the maximum pixel value and the minimum pixel value; and determining the first sub-table from the mapping table according to the number of pixel values starting from the minimum pixel value.

21. The computer-readable storage medium according to clause 15, wherein performing the table lookup on the pixel values of the multiple pixels in the to-be-processed image according to the mapping table in parallel to obtain the mapped values each corresponding to a pixel of the multiple pixels includes:

segmenting the mapping table to obtain multiple third sub-tables;

performing parallel table lookups on the pixel values of the multiple pixels in the multiple third sub-tables respectively to obtain multiple sets of query results; and merging the multiple sets of query results to obtain respective mapped values each corresponding to a pixel of the multiple pixels. 22. An encoding method, including: determining a to-be-processed image block;

converting a luma component of the to-be-processed image block from an original domain to a mapped domain through forward mapping, and converting the luma component of the to-be-processed image block from the mapped domain to the original domain through inverse mapping, wherein least one of the forward mapping and the inverse mapping is implemented by the method according to any of clauses 1 to 7; and encoding according to the mapped luma component to obtain a code stream.

22. A decoding method, including:

decoding a code stream to obtain a to-be-processed image block;

converting a luma component of the to-be-processed image block from an original domain to a mapped domain through forward mapping, and converting the luma component of the to-be-processed image block from the mapped domain to the original domain through inverse mapping, wherein least one of the forward mapping and the inverse mapping is implemented by the method according to any of clauses 1 to 7; and determining a mapped image corresponding to the to-be-processed image according to the mapped values obtained based on the table lookup; and decoding according to the mapped luma component to obtain a video frame.

It is to be noted that, the terms such as "first" and "second" in the specification and claims of this disclosure and the above accompanying drawings are used for distinguishing similar objects but not necessarily used for describing particular order or sequence. It is to be understood that such used data is interchangeable where appropriate so that the examples of this disclosure described here can be implemented in an order other than those illustrated or described here. Moreover, the terms "include", "have" and any other variants thereof mean to cover the non-exclusive inclusion. For example, a process, method, system, product, or device that includes a list of steps or units is not necessarily limited to those expressly listed steps or units, but may include other steps or units not expressly listed or inherent to such a process, method, system, product, or device.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It is to be understood that the disclosed technical content may be implemented in other ways. The apparatus embodiments described above are only schematic. For example, the division of the units is only a logical function division. In actual implementations, there may be another division manner. For example, multiple units or components may be combined or integrated into another system, or some features can be ignored or not implemented. In addition, the displayed or discussed mutual coupling or direct coupling or communication connection may be indirect coupling or communication connection through some interfaces, units, or modules, which may be in electrical or other forms.

The units described as separate components may or may not be physically separated, and the components displayed as units may or may not be physical units, that is, they may be located in one place or may be distributed to a plurality of network units. Part of or all the units may be selected according to actual needs to achieve the purpose of the solution described in some embodiments of the present disclosure.

In addition, the functional units in various embodiments of the present disclosure may be integrated into one processing unit, or each unit may exist alone physically, or two or more units may be integrated into one unit. The integrated units described above may be implemented either in the form of hardware or in the form of a software functional unit.

If the integrated units are implemented in the form of a software functional unit and sold or used as an independent product, they may be stored in a quantum computer-readable storage medium. Based on such an understanding, the technical solutions of the present disclosure essentially, or the part making contributions to the prior art, or all or part of the technical solutions may be embodied in the form of a software product. The quantum computer software product is stored in a storage medium and includes several instructions used for causing a quantum computer device to execute all or part of steps of the methods in various embodiments of the present disclosure.

The foregoing descriptions are merely preferred implementations of the present disclosure. It is to be noted that a plurality of improvements and refinements may be made by those of ordinary skill in the technical field without departing from the principle of the present disclosure, and shall fall within the scope of protection of the present disclosure.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for encoding a video sequence, the method comprising:

receiving a video sequence; and encoding the video sequence by:

determining a to-be-processed image and a mapping table corresponding to the to-be-processed image;

performing a table lookup on pixel values of multiple pixels in the to-be-processed image according to the mapping table in parallel to obtain mapped values each corresponding to a pixel of the multiple pixels; and determining a mapped image corresponding to the to-be-processed image according to the mapped values obtained based on the table lookup;

comparing the pixel values of the multiple pixels to determine a maximum pixel value and a minimum pixel value; wherein performing the table lookup on the pixel values of the multiple pixels in the to-be-processed image according to the mapping table in parallel to obtain the mapped values each corresponding to a pixel of the multiple pixels comprises:

determining a first sub-table of a pixel value range corresponding to the maximum pixel value and the minimum pixel value from the mapping table; and performing the table lookup on the pixel values of the multiple pixels according to the first sub-table in parallel to obtain the mapped values each corresponding to a pixel of the multiple pixels.

2. The method according to claim 1, wherein the number of the multiple pixels is m times of a degree of parallelism of the table lookup, m being a positive integer, and performing the table lookup on the pixel values of the multiple pixels according to the first sub-table in parallel to obtain the mapped values each corresponding to a pixel of the multiple pixels comprises:

dividing the pixel values of the multiple pixels into m groups of to-be-queried pixel values according to the degree of parallelism; and performing a NEON-based parallel table lookup on the to-be-queried pixel values according to the first sub-table by groups to obtain the mapped values each corresponding to a pixel of the multiple pixels.

3. The method according to claim 2, wherein performing the NEON-based parallel table lookup on the to-be-queried pixel values according to the first sub-table by groups to obtain the mapped values each corresponding to a pixel of the multiple pixels comprises:

segmenting the first sub-table to obtain multiple second sub-tables;

performing the NEON-based parallel table lookup on the to-be-queried pixel values according to the multiple second sub-tables by groups to obtain multiple sets of query results corresponding to respective groups of the to-be-queried pixel values; and merging the multiple sets of query results to obtain respective mapped values corresponding to respective groups of the to-be-queried pixel values.

4. The method according to claim 1, wherein comparing the pixel values of the multiple pixels to determine the maximum pixel value and the minimum pixel value comprises:

initializing a maximum value register and a minimum value register, where the number of pixel values stored in the maximum value register or the minimum value register is i, and the number of the multiple pixels is n times the number of the pixel values i, n being a positive integer;

dividing the pixel values of the multiple pixels into n groups of to-be-compared pixel values, where each group of the to-be-compared pixel values comprises i pixel values;

comparing each group of the to-be-compared pixel values with the pixel values stored in the maximum value register bit by bit, and updating the i pixel values stored in the maximum value register according to the maximum value in the comparison result;

comparing each group of the to-be-compared pixel values with the pixel values stored in the minimum value register bit by bit, and updating the i pixel values stored in the minimum value register according to the minimum value in the comparison result; and determining the maximum pixel value from the i pixel values stored in the maximum value register, and determining the minimum pixel value from the i pixel values stored in the minimum value register.

5. The method according to claim 1, wherein determining the first sub-table of the pixel value range corresponding to the maximum pixel value and the minimum pixel value from the mapping table comprises:

determining the number of pixel values of the first sub-table according to a difference between the maximum pixel value and the minimum pixel value; and determining the first sub-table from the mapping table according to the number of pixel values starting from the minimum pixel value.

6. The method according to claim 1, wherein performing the table lookup on the pixel values of the multiple pixels in the to-be-processed image according to the mapping table in parallel to obtain the mapped values each corresponding to a pixel of the multiple pixels comprises:

segmenting the mapping table to obtain multiple third sub-tables;

performing parallel table lookups on the pixel values of the multiple pixels in the multiple third sub-tables respectively to obtain multiple sets of query results; and merging the multiple sets of query results to obtain respective mapped values each corresponding to a pixel of the multiple pixels.

7. The method according to claim 1, further comprising:

storing a bitstream that is generated based on the encoding.

8. A method for decoding a bitstream, the method comprising:

receiving a bitstream; and decoding the bitstream to generate a video sequence, the decoding comprising:

determining a to-be-processed image and a mapping table corresponding to the to-be-processed image;

performing a table lookup on pixel values of multiple pixels in the to-be-processed image according to the mapping table in parallel to obtain mapped values each corresponding to a pixel of the multiple pixels; and determining a mapped image corresponding to the to-be-processed image according to the mapped values obtained based on the table lookup;

comparing the pixel values of the multiple pixels to determine a maximum pixel value and a minimum pixel value; wherein performing the table lookup on the pixel values of the multiple pixels in the to-be-processed image according to the mapping table in parallel to obtain the mapped values each corresponding to a pixel of the multiple pixels comprises:

determining a first sub-table of a pixel value range corresponding to the maximum pixel value and the minimum pixel value from the mapping table; and performing the table lookup on the pixel values of the multiple pixels according to the first sub-table in parallel to obtain the mapped values each corresponding to a pixel of the multiple pixels.

9. The method according to claim 8, wherein the number of the multiple pixels is m times of a degree of parallelism of the table lookup, m being a positive integer, and performing the table lookup on the pixel values of the multiple pixels according to the first sub-table in parallel to obtain the mapped values each corresponding to a pixel of the multiple pixels comprises:

dividing the pixel values of the multiple pixels into m groups of to-be-queried pixel values according to the degree of parallelism; and performing a NEON-based parallel table lookup on the to-be-queried pixel values according to the first sub-table by groups to obtain the mapped values each corresponding to a pixel of the multiple pixels.

10. The method according to claim 9, wherein performing the NEON-based parallel table lookup on the to-be-queried pixel values according to the first sub-table by groups to obtain the mapped values each corresponding to a pixel of the multiple pixels comprises:

segmenting the first sub-table to obtain multiple second sub-tables;

performing the NEON-based parallel table lookup on the to-be-queried pixel values according to the multiple second sub-tables by groups to obtain multiple sets of query results corresponding to respective groups of the to-be-queried pixel values; and merging the multiple sets of query results to obtain respective mapped values corresponding to respective groups of the to-be-queried pixel values.

11. The method according to claim 8, wherein comparing the pixel values of the multiple pixels to determine the maximum pixel value and the minimum pixel value comprises:

initializing a maximum value register and a minimum value register, where the number of pixel values stored in the maximum value register or the minimum value register is i, and the number of the multiple pixels is n times the number of the pixel values i, n being a positive integer;

dividing the pixel values of the multiple pixels into n groups of to-be-compared pixel values, where each group of the to-be-compared pixel values comprises i pixel values;

comparing each group of the to-be-compared pixel values with the pixel values stored in the maximum value register bit by bit, and updating the i pixel values stored in the maximum value register according to the maximum value in the comparison result;

comparing each group of the to-be-compared pixel values with the pixel values stored in the minimum value register bit by bit, and updating the i pixel values stored in the minimum value register according to the minimum value in the comparison result; and determining the maximum pixel value from the i pixel values stored in the maximum value register, and determining the minimum pixel value from the i pixel values stored in the minimum value register.

12. The method according to claim 8, wherein determining the first sub-table of the pixel value range corresponding to the maximum pixel value and the minimum pixel value from the mapping table comprises:

determining the number of pixel values of the first sub-table according to a difference between the maximum pixel value and the minimum pixel value; and determining the first sub-table from the mapping table according to the number of pixel values starting from the minimum pixel value.

13. The method according to claim 8, wherein performing the table lookup on the pixel values of the multiple pixels in the to-be-processed image according to the mapping table in parallel to obtain the mapped values each corresponding to a pixel of the multiple pixels comprises:

segmenting the mapping table to obtain multiple third sub-tables;

performing parallel table lookups on the pixel values of the multiple pixels in the multiple third sub-tables respectively to obtain multiple sets of query results; and merging the multiple sets of query results to obtain respective mapped values each corresponding to a pixel of the multiple pixels.

14. A method for signaling a bitstream, the method comprising:

receiving a video sequence;

encoding the video sequence by:

determining a to-be-processed image and a mapping table corresponding to the to-be-processed image;

performing a table lookup on pixel values of multiple pixels in the to-be-processed image according to the mapping table in parallel to obtain mapped values each corresponding to a pixel of the multiple pixels; and determining a mapped image corresponding to the to-be-processed image according to the mapped values obtained based on the table lookup;

comparing the pixel values of the multiple pixels to determine a maximum pixel value and a minimum pixel value; wherein performing the table lookup on the pixel values of the multiple pixels in the to-be-processed image according to the mapping table in parallel to obtain the mapped values each corresponding to a pixel of the multiple pixels comprises:

determining a first sub-table of a pixel value range corresponding to the maximum pixel value and the minimum pixel value from the mapping table; and performing the table lookup on the pixel values of the multiple pixels according to the first sub-table in parallel to obtain the mapped values each corresponding to a pixel of the multiple pixels; and signaling a bitstream that is generated based on the encoding.

15. The method according to claim 14, wherein the number of the multiple pixels is m times of a degree of parallelism of the table lookup, m being a positive integer, and performing the table lookup on the pixel values of the multiple pixels according to the first sub-table in parallel to obtain the mapped values each corresponding to a pixel of the multiple pixels comprises:

dividing the pixel values of the multiple pixels into m groups of to-be-queried pixel values according to the degree of parallelism; and performing a NEON-based parallel table lookup on the to-be-queried pixel values according to the first sub-table by groups to obtain the mapped values each corresponding to a pixel of the multiple pixels.

16. The method according to claim 15, wherein performing the NEON-based parallel table lookup on the to-be-queried pixel values according to the first sub-table by groups to obtain the mapped values each corresponding to a pixel of the multiple pixels comprises:

segmenting the first sub-table to obtain multiple second sub-tables;

performing the NEON-based parallel table lookup on the to-be-queried pixel values according to the multiple second sub-tables by groups to obtain multiple sets of query results corresponding to respective groups of the to-be-queried pixel values; and merging the multiple sets of query results to obtain respective mapped values corresponding to respective groups of the to-be-queried pixel values.

17. The method according to claim 14, wherein comparing the pixel values of the multiple pixels to determine the maximum pixel value and the minimum pixel value comprises:

initializing a maximum value register and a minimum value register, where the number of pixel values stored in the maximum value register or the minimum value register is i, and the number of the multiple pixels is n times the number of the pixel values i, n being a positive integer;

dividing the pixel values of the multiple pixels into n groups of to-be-compared pixel values, where each group of the to-be-compared pixel values comprises i pixel values;

comparing each group of the to-be-compared pixel values with the pixel values stored in the maximum value register bit by bit, and updating the i pixel values stored in the maximum value register according to the maximum value in the comparison result;

comparing each group of the to-be-compared pixel values with the pixel values stored in the minimum value register bit by bit, and updating the i pixel values stored in the minimum value register according to the minimum value in the comparison result; and determining the maximum pixel value from the i pixel values stored in the maximum value register, and determining the minimum pixel value from the i pixel values stored in the minimum value register.

18. The method according to claim 14, wherein determining the first sub-table of the pixel value range corresponding to the maximum pixel value and the minimum pixel value from the mapping table comprises:

determining the number of pixel values of the first sub-table according to a difference between the maximum pixel value and the minimum pixel value; and determining the first sub-table from the mapping table according to the number of pixel values starting from the minimum pixel value.

\* \* \* \* \*